United States Patent
Takimoto et al.

(10) Patent No.: US 6,752,417 B2
(45) Date of Patent: Jun. 22, 2004

(54) KNEE PROTECTING AIRBAG DEVICE

(75) Inventors: Masahiro Takimoto, Aichi-ken (JP); Toru Koyama, Aichi-ken (JP); Satoshi Funabashi, Susono (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 42 days.

(21) Appl. No.: 10/137,468

(22) Filed: May 3, 2002

(65) Prior Publication Data

US 2002/0171230 A1 Nov. 21, 2002

(30) Foreign Application Priority Data

May 21, 2001 (JP) ......................................... 2001-150435
May 21, 2001 (JP) ......................................... 2001-150448

(51) Int. Cl.[7] .............................................. B60R 21/22
(52) U.S. Cl. .................................... 280/730.1; 280/753
(58) Field of Search ............................. 280/730.1, 753

(56) References Cited

U.S. PATENT DOCUMENTS

| | | | | |
|---|---|---|---|---|
| 3,618,977 A | * | 11/1971 | Klove et al. ............. | 280/730.1 |
| 3,642,303 A | * | 2/1972 | Irish et al. ............... | 280/730.1 |
| 3,768,830 A | * | 10/1973 | Hass .......................... | 280/729 |
| 4,262,931 A | * | 4/1981 | Strasser et al. ............. | 280/729 |
| 5,536,043 A | | 7/1996 | Lang et al. | |
| 5,775,729 A | | 7/1998 | Schneider et al. | |
| 5,931,493 A | * | 8/1999 | Sutherland ............... | 280/730.1 |
| 6,032,978 A | | 3/2000 | Spencer et al. | |
| 6,155,595 A | * | 12/2000 | Schultz ........................ | 280/729 |
| 6,170,871 B1 | * | 1/2001 | Goestenkors et al. .... | 280/743.1 |
| 6,186,542 B1 | * | 2/2001 | Enders et al. ............. | 280/743.1 |
| 6,213,497 B1 | | 4/2001 | Spencer et al. | |
| 6,217,059 B1 | * | 4/2001 | Brown et al. ............. | 280/730.2 |

FOREIGN PATENT DOCUMENTS

| | | |
|---|---|---|
| DE | 197 14 174 A1 | 9/1998 |
| DE | 298 07 424 U1 | 10/1998 |
| DE | 197 49 585 A1 | 5/1999 |
| DE | 19900592 | 7/2000 |
| DE | 199 46 477 A1 | 3/2001 |
| EP | 684 167 | 11/1995 |
| EP | 818 360 | 1/1998 |
| GB | 2 263 671 | 8/1993 |
| JP | 10-59103 | 3/1989 |
| JP | 5-208646 | 8/1993 |
| JP | 08-080797 | 3/1996 |
| JP | 8-301054 | 11/1996 |
| JP | 9123863 | 5/1997 |
| JP | 10071911 | 3/1998 |
| JP | 10-315894 | 12/1998 |
| JP | A-10-315894 | 12/1998 |
| JP | 11240411 | 9/1999 |
| JP | 2000-225911 | 8/2000 |
| WO | WO 02/04261 | 1/2002 |
| WO | WO 02/04262 | 1/2002 |

* cited by examiner

*Primary Examiner*—Peter M. Poon
*Assistant Examiner*—Bret Hayes
(74) *Attorney, Agent, or Firm*—Posz & Bethards, PLC

(57) ABSTRACT

A knee protecting airbag device includes a folded airbag housed below a member attached to the vehicle body and in front of the knees of a seated passenger. The airbag extends and expands when fed with an inflating gas toward the rear of the vehicle to protect the knees of the passenger. The airbag includes a lower expansion portion, which is upstream in the flow of the gas, and an upper expansion portion, which is downstream. The lower expansion portion protrudes toward the rear of the vehicle to protect the knees. The upper expansion portion protrudes upward from the lower expansion portion. The airbag properly protects the knees of the passenger by extending and expanding efficiently, taking into account the time elapsed, until completion of the extension and expansion.

5 Claims, 20 Drawing Sheets

KNEE PROTECTING AIRBAG DEVICE

The present application claims priority to Japanese patent application No. 2001-150435 of Takimoto et al., filed May 21, 2001, and Japanese patent application No. 2001-150448 of Takimoto et al., filed May 21, 2001, and the entirety of each is hereby incorporated into the present application by reference.

BACKGROUND OF THE INVENTION

The present invention relates to a knee protecting airbag device which is provided with an airbag capable of protecting the knees of the passenger or driver in the front seats. The airbag extends and expands from a folded state when it is fed with an inflating gas.

In the prior art, a device for protecting the knees of a driver or a passenger has been disclosed in Unexamined Published Japanese Patent Application No. 80797/1996 or No. 315894/1998.

The airbag device of No. 80797/1996 is arranged at a portion on the lower side of a lower cover of a dashboard. This airbag device is provided with an airbag for protecting the driver from the ankles to the knees. When the airbag device is activated, the airbag protrudes obliquely upward from a lower position by extending and expanding.

The airbag device of No. 315894/1998 is arranged near a column cover below the steering wheel. This airbag device is provided with an extensible and expandable airbag. This airbag extends and expands to protect the area from the lower portions of the knees to the vicinity of the toes of the driver.

However, such knee protecting airbag devices have room for improvement with regard to efficient expansion with the passage of time from the start to the completion of the extension and expansion of the airbag, to protect the knees of a passenger such as the driver.

SUMMARY OF THE INVENTION

In view of this, an object of the present invention is to provide a knee protecting airbag device that can properly protect the knees of a passenger or driver in the front seat by extending and expanding the airbag efficiently throughout the extension and expansion of the airbag.

The vertical, transverse and longitudinal directions correspond to the vertical, transverse and longitudinal directions of the vehicle.

The word "passenger" is used to refer to either a driver or a person in the passenger seat. That is, the word "passenger" includes the driver.

In order to achieve the above-specified object, there is provided a knee protecting airbag device comprising an airbag for inflating, when fed with an inflating gas, to protect the knees of a passenger, and a housing portion for housing the airbag when folded. The housing portion is arranged on the lower side of a member on the vehicle body and in front of the knees of the seated passenger. The housing portion includes an opening for permitting the airbag to protrude toward the rear of the vehicle. The airbag is arranged in front of the knees of the passenger to extend and expand when fed with the inflating gas, out from the housing portion toward the vehicle rear. The airbag includes a lower expansion portion and an upper expansion portion. The lower expansion portion is in an upstream part of the flow of inflating gas and protrudes from the opening of the housing portion toward the rear, when fed with the inflating gas, to cover the front sides of the knees. The upper expansion portion is in a downstream part of the flow of inflating gas and protrudes upward from the lower expansion portion along the rear side of a member attached to the vehicle body to cover the periphery of the airbag opening and at least the portion above the airbag opening.

Just after the knee protecting airbag device of the invention is activated, the vehicle completes the front collision, and the knees of the passenger move forward relative to the vehicle. Just after the action of the airbag device, however, the lower expansion portion is located in the upstream part of the flow of the inflating gas and expands prior to the upper expansion portion, while protruding to the rear from the airbag opening. Therefore, the knees of the passenger can be properly protected by the lower expansion portion even if the knees move forward relative to the vehicle.

After the initial stage of the extension and expansion of the airbag, the knees of the passenger are bent to rise if the passenger moves relative to the vehicle while the feet of the passenger remain on the floor panel. In other words, the knees move upward to the rear side of a member attached to the vehicle body. This state takes place whether the knees are in or out of contact with the airbag. At this time, the airbag has already passed through the initial stage of the extension and expansion, and the upper expansion portion, which is in the downstream side of the inflating gas, has extended upward from the lower expansion portion along the rear side of a member attached to the vehicle body and has expanded to cover the periphery of the airbag opening and at least the portion above the airbag opening. Therefore, the upper expansion portion protects the upwardly moving knees. In other words, the knees can be protected against hard members such as the key cylinder by the upper expansion portion of the airbag even if the hard members are arranged in front of the upper expansion portion.

The upper expansion portion may start its expansion either after or before the expansion of the lower expansion portion is completed.

In the knee protecting airbag device according to the present invention, the expansions of the lower expansion portion and the upper expansion portion are completed to cover the position of the moving knees of the passenger. In other words, the airbag device of the invention adjusts the expansion mode of the airbag according to the time lapse from the start to the completion of the extension and expansion. In the airbag device of the invention, the airbag is not extended and expanded to provide a large protection area from the beginning of the expansion. Therefore, the airbag device can protect the two knees of the passenger properly without using a high-output inflator or an airbag having a large volume.

In the knee protecting airbag device according to the invention, therefore, the knees of the passenger can be properly protected by extending and expanding the airbag efficiently as the time elapses from the start to the completion of the extension and expansion of the airbag.

It is desired that the airbag is provided with a tether arranged in the interior of the airbag for connecting the vehicle and the passenger side (front and rear) walls of the airbag to regulate the thickness of the airbag when the lower expansion portion is extending and expanding. With this construction, the distance (or the thickness of the lower expansion portion) between the front wall and the rear wall of the airbag is regulated during expansion. In other words, the airbag feeds the inflating gas to the upper expansion portion without filling the lower expansion portion unnecessarily. Therefore, the airbag can promote the completion of expansion of the upper expansion portion. At the extending and expanding time of the lower expansion portion, it is of course necessary that the lower expansion portion is restrained from becoming excessively thick. Therefore, the lower expansion portion is smoothly arranged at a predetermined position even if the space between the front of the passenger compartment and the knees of the passenger is narrow.

It is desired that a flow-directing cloth is arranged in the airbag for guiding the inflating gas from the lower expansion portion to the upper expansion portion. With this construction, the inflating gas is directed from the lower expansion portion to the upper expansion portion by the flow-directing cloth, and the upper expansion portion easily protrudes upward from the lower expansion portion along the rear face of the member attached to the vehicle body while airbag protrusion directly out toward the rear is limited. As a result, the upper expansion portion is smoothly arranged between the knees of the passenger and the rear face of the vehicle side member.

In this case, the protrusion of the upper expansion portion to the rear can be further limited if the flow-directing cloth is arranged to guide the inflating gas upward along the rear face of the vehicle side member.

When the inflator is arranged in the lower expansion portion of the airbag, and the tethers connecting the front and rear airbag walls are arranged above and below the inflator, the flow-directing cloth may be formed into a sheet shape and may be supported by the tethers.

The airbag may have a cushioning pad attached to the outer surface of the rear wall in the lower expansion portion. This pad is made substantially flush with the peripheral edge of the protruding opening when the airbag is housed in the housing portion to clog the protruding opening, and moves when the airbag is extending and expanding to the rear of the vehicle as the lower expansion portion protrudes, so that it is arranged in front of the knees. With this construction, before the activation of the airbag device, the pad can close the protruding opening to improve the design of the peripheral edge of the protruding opening. When the airbag is extending and expanding, the cushioning pad moves to the rear as the lower expansion portion protrudes and is positioned in front of the knees. Therefore, the pad can protect the knees properly even if the knees move forward relative to the vehicle. The upper expansion portion expands and is arranged over the pad. Therefore, the upper expansion portion can protect the knees against hard members such as the key cylinder, even if the knees move upward where hard members on the rear side of the vehicle side member are located.

When the airbag includes a wall portion on the front side upon completion of the extension and expansion, and a wall portion on the rear side, opposite to the front side, upon completion of the extension and expansion, it is desired that the airbag is folded through a step of rolling the upper edge toward the front side wall. With this construction, at the time of unfolding the portions that were folded by rolling, the upper edge side of the airbag extends and expands along the rear face of the member attached to the vehicle while being unrolled, and the extension and expansion are then completed. At this time, the airbag is unfolded while coming as close to the rear side of the member attached to the vehicle as possible. Therefore, extension and expansion of the airbag toward the knees of the passenger is limited. The airbag can smoothly extend while being unrolled, even if it comes into contact with the knees of the passenger.

It is natural that the airbag need not be rolled, as described above. For example, the airbag may be folded in a cactus folding, such that the outer peripheral edge is folded within the airbag so that it may be housed in the housing portion.

The airbag may be constructed to extend further to the right or left when expansion is completed so that it can cover a hard member arranged on an instrument panel upon completion of the extension and expansion.

On the other hand, the airbag may be constructed such that its upper end portion upon completion of the extension and expansion has a smaller transverse size than the lower end portion. This construction may fail to cover the hard members arranged in the instrument panel. However, the airbag is provided with the upper expansion portion for covering the area above the airbag opening at the rear side of the member attached to the vehicle. Therefore, the upper expansion portion can protect the knees against the hard members near the portion of the rear side of the member attached to the vehicle that is closer to the passenger. Moreover, this airbag is reduced in total volume through narrowing the airbag at the left and right sides of the upper end portion. Therefore, this airbag has a shortened time period from the start to the completion of its expansion.

The airbag may be manufactured either by sewing the wall portions flat against each other or by sewing pieces which have been cut to match the three-dimensional expanded shape.

Still moreover, it is desired that at the initial stage of the extension and expansion of the airbag, the lower expansion portion protrudes to the rear from the airbag opening of the housing portion, and extends and expands transversely to cover the left and right peripheral edges of the airbag opening. With this construction, the airbag widely extends and expands so leftward and rightward that the lower expansion portion may cover the left and right peripheral edges of the protruding opening at the initial stage of the extension and expansion. Just after the action of the knee protecting airbag device, more specifically, the vehicle completes the front collision so that the knees of the passenger move forward relative to the vehicle. If the lower expansion portion extends and expands widely leftward and rightward from the peripheral edge of the protruding opening, it can protect the knees of the passenger properly even if the knees move a great deal leftward or rightward by the braking operation.

Means for extending and expanding the lower expansion portion transversely can be constructed of a gas flow guide member arranged in the airbag for guiding the inflating gas in the lower expansion portion to two transverse sides.

When a tether is arranged in the airbag for connecting the front wall and the rear wall to regulate the thickness of the lower expansion portion when extending and expanding, the tether may constitute a gas flow guide member. The left and right ends of the tether is spaced from the left and right edges of the airbag and arranged in the transverse directions. In this airbag, the gas communication ports are formed between the left and right ends of the tether and the left and right edges of the airbag. Therefore, the inflating gas in the lower expansion portion is guided by the tether to flow from the left and right gas communication ports into the upper expansion portion. The gas flows in the lower expansion portion to the two left and right sides so that the lower expansion portion extends and expands widely leftward and rightward to cover the left and right peripheral edges of the airbag opening.

In the tether thus far described, if the tether arranges a gas communication port near its transverse center for feeding the inflating gas to the upper expansion portion, the expansion of the upper expansion portion can be promoted by the gas communication port near the center.

When an inflator for discharging the inflating gas is arranged in the lower expansion portion of the airbag, the gas flow guide member may be formed in a tubular shape with its two left and right ends opened and covering the inflator.

In this case, if the gas flow guide member has an auxiliary opening at a transverse central portion for feeding the inflating gas to the upper expansion portion, and the expansion of the upper expansion portion can be promoted by the auxiliary opening.

In this case, if the gas flow guide member has narrowed ends and if the auxiliary opening is sewn at its peripheral edge with a sewing thread for allowing the auxiliary opening to open, when thread breaks, the auxiliary opening is not opened from the beginning of the gas inflow. In this airbag, however, after the lower expansion portion is extended and expanded to a certain extent leftward and rightward, the inflating gas is fed from the auxiliary opening to the upper expansion portion because the auxiliary opening opens.

The means for extending and expanding the lower expansion portion widely leftward and rightward may be the folded shape of the airbag. For example, an inflator for discharging the inflating gas is arranged near the transverse center in the lower expansion portion of the airbag, and the airbag includes a wall arranged on the vehicle side upon completion of the extension and expansion, and a wall on the passenger side opposite the vehicle side wall upon completion of the extension and expansion. Also, the airbag is folded vertically so that it is narrowed on the left and on the right. The rear wall is constructed with portions (joined portions) which are joined to the transverse central portion and arranged respectively between the transverse central portion and the left and right edges of the airbag. In this case, means for extending and expanding the lower expansion portion transversely may consist of a fold which the folded portions of the two left and right edges of the airbag are respectively arranged on the side of the front wall portion at the positions of the left and right joined portions of the rear wall, at the vertical folding step.

With this construction, as the folded portions on the two left and right edge sides of the airbag are unfolded, they are directed toward the vehicle away from the joining positions and are unfolded while expanding widely leftward and rightward. Then, the lower expansion portion of the airbag completes its extension and expansion. At the initial stage of the extension and expansion of the airbag, more specifically, the lower expansion portion of the airbag extends and expands widely leftward and rightward from the peripheral edge of the airbag opening.

DESCRIPTION OF THE PREFERRED EMBODIMENTS

Figure 1:
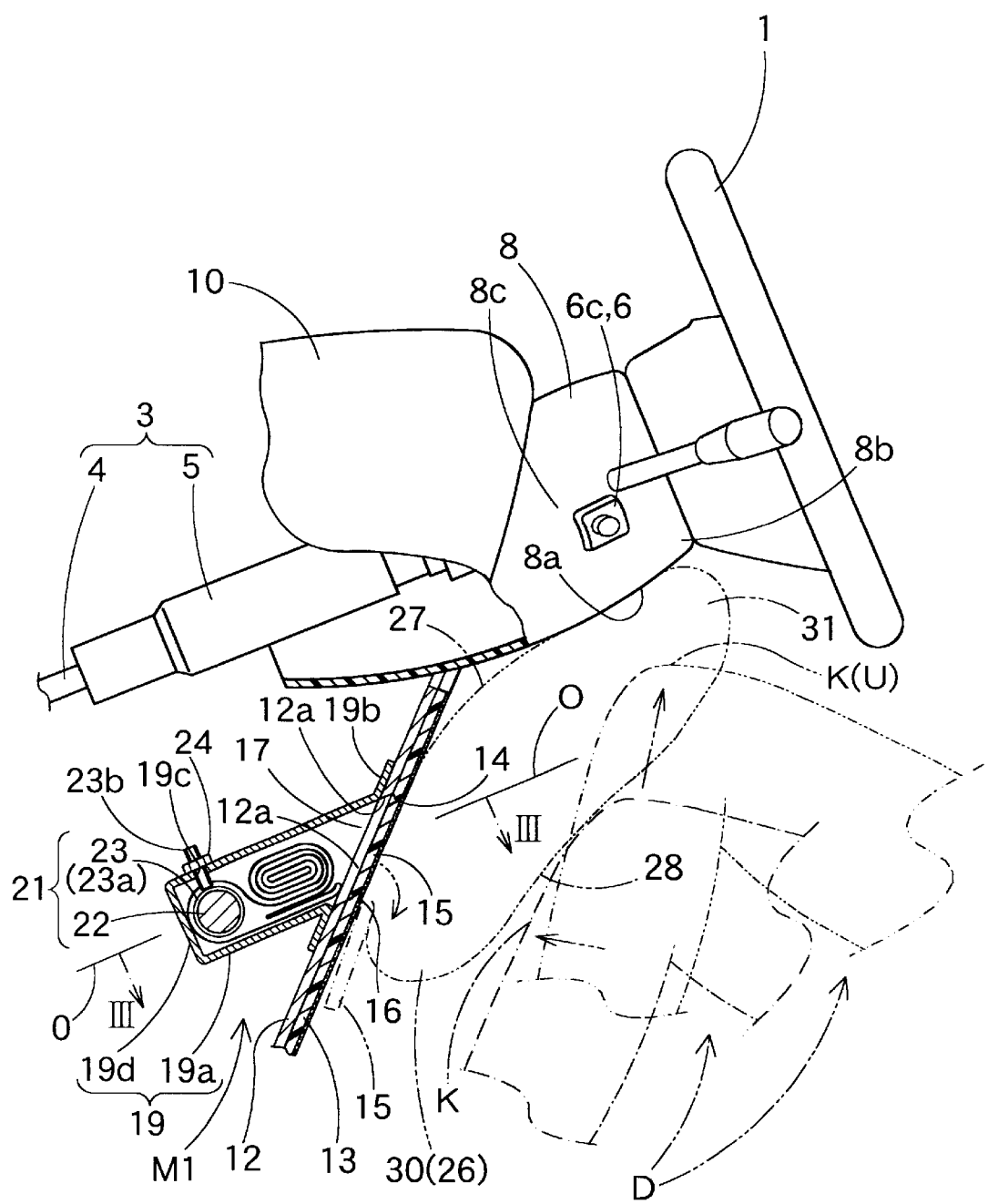
FIG. 1 is a schematic longitudinal section showing the operating state of a knee protecting airbag device according to a first embodiment of the invention.

The invention will be described below by way of the embodiments shown in the drawings. In addition, the invention is not limited to the illustrated embodiments. All modifications within the requirements of the claims and equivalents with respect to the requirements should be included in the scope of the claims.

Figure 2:
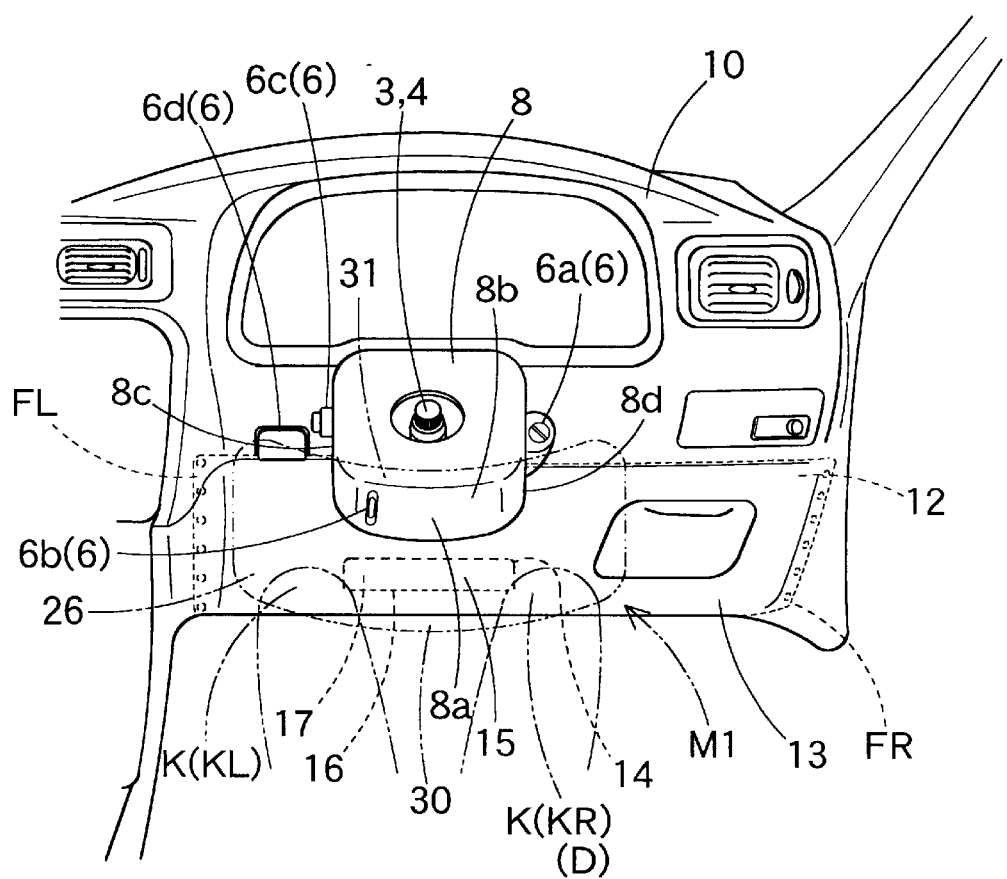
FIG. 2 is a schematic compartment front view taken from the rear side of the vehicle showing the operating state of the knee protecting airbag device of the first embodiment.
Figure 3:
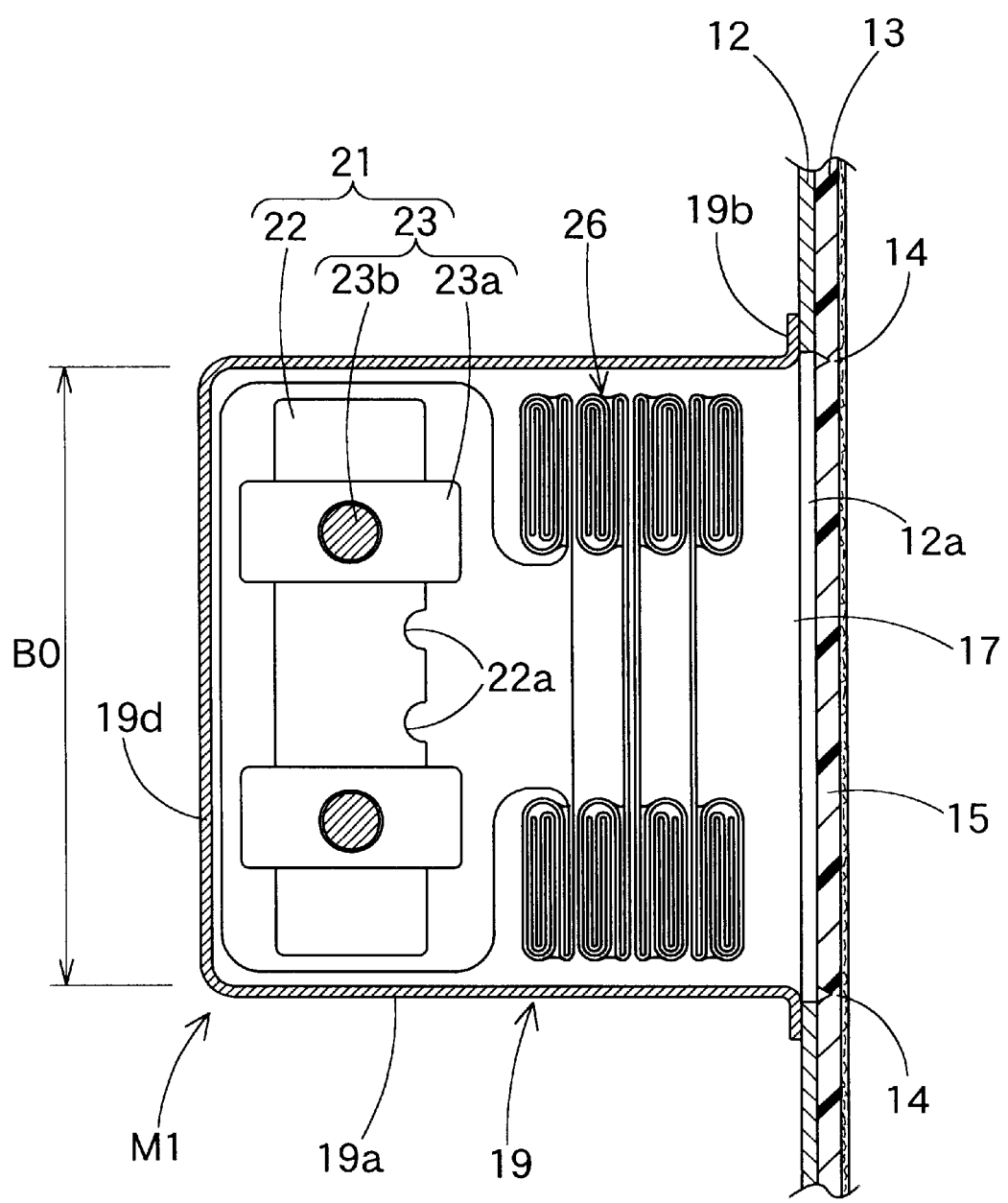
FIG. 3 is a sectional view taken along line III—III of FIG. 1.

As shown in FIGS. 1 to 3, a knee protecting airbag device M1 according to a first embodiment is arranged below a steering column 3. The airbag device M1 is constructed to include a folded airbag 26, an inflator 21 for feeding an inflating gas to the airbag 26, a case 19 for housing the airbag 26 and the inflator 21, an airbag cover 13 for covering the folded airbag 26, and a holding member 12 for holding the case 19. In the airbag device M1, the case 19 housing the airbag 26 is held by the holding member 12. The holding member 12 is connected and fixed to frame portions FL and FR of a vehicle. As a result, the folded airbag 26 is arranged below the steering column 3 and in front of the knees K (KL and KR) of a driver D or a seated passenger.

The steering column 3 is provided, as shown in FIG. 1, with a main shaft 4 connected to a steering wheel 1, and a column tube 5 enclosing the main shaft 4. Between the main shaft 4 and the column tube 5, there are arranged a tilt mechanism, a telescopic mechanism and so on. The tilt mechanism adjusts the angle of the ring face of the steering wheel 1. The telescopic mechanism can move the steering wheel 1 in the axial direction of the shaft 4 and can stop it at a predetermined position. As shown in FIG. 2, a control portion (or a control lever) 6b of the tilt mechanism is arranged and exposed to the rear face (or the lower face) 8a of a column cover 8. A control portion (or a control lever) 6c of the telescopic mechanism is arranged and exposed to the left side face 8c of the column cover 8.

Moreover, the column cover 8 is formed of a synthetic resin into a generally square tubular shape or the like. The column cover 8 is a part of a member attached to the vehicle body. The cover 8 is arranged to cover the steering column 3 below the steering wheel 1 and to extend along an axial direction of the steering column 3. In short, the cover 8 is arranged to have its front side at a lower level and its rear side at a higher level. In other words, the cover 8 is inclined to rise toward the rear. The rear (or lower) face 8a of the column cover 8 is formed into a generally rectangular shape. The rear face 8a of the cover 8 is curved to rise toward the rear.

On the right side face 8d of the column cover 8, there is arranged a key cylinder 6a of a steering lock mechanism. The key cylinder 6a and the aforementioned control portions 6b and 6c act, when the rear face 8a of the column cover 8 interferes with the knees (KL and KR) of the driver D, as hard members 6.

The holding member 12 is formed of flat sheet metal, as shown in FIGS. 1 and 2. The holding member 12 is arranged below the column cover 8. The holding member 12 is extended leftward and rightward from below the cover 8 and is arranged at a position on the lower side of an instrument panel (or dashboard) 10. The holding member 12 is inclined such that the upper edge is behind the lower edge, as shown in FIG. 1. In short, the holding member 12 is inclined to rise toward the rear. The holding member 12 is connected and fixed at each side to the frame portions FL and FR of the vehicle by bolts. The frame portions FL and FR are arranged on the left and right of the airbag device M1. The holding member 12 mounts and fixes the case 19 on the front side face of the vehicle by using unillustrated bolts, nuts, rivets and welding. In the mounting portion of the holding member 12 for the case 19, there is formed a through hole 12a. The through hole 12a communicates with the opening 17 of the case 19. The airbag 26 protrudes into the vehicle compartment through the opening 17 and the through hole 12a. In short, the airbag 26, upon expansion, protrudes toward the rear of the vehicle from the case 19. The through hole 12a has a generally rectangular shape to correspond to the opening 17 of the case 19.

In the case of the illustrated embodiment, the airbag cover 13 is mounted and fixed on the face of the holding member 12 facing the rear side of the vehicle, as shown in FIGS. 1 to 3. The airbag cover 13 is also attached to the vehicle body. The cover 13 covers the rear side of the folded airbag 26. The cover 13 covers the interior face of the holding member 12. In the airbag cover 13, there is formed a generally rectangular door portion 15, which is located at the opening 17. The door portion 15 is opened into the passenger compartment when pushed by the airbag 26, upon expansion of the airbag 26. Around the door portion 15, there is arranged a thin portion 14, which is designed to break. The thin portion 14 has an inverted U-shape, as viewed from the interior. On the lower edge of the door portion 15, there is a hinge portion 16. The hinge portion 16 is an integral hinge. When the airbag 26 expands, the door portion 15 is pushed by the airbag 26 and is broken at the thin portion 14 so that it pivots downward about the hinge portion 16 toward the interior.

As shown in FIGS. 1 to 3, the case 19 is formed of sheet metal into a generally rectangular box shape. The case 19 houses the folded airbag 26. In the case of the illustrated embodiment, the case 19 houses the airbag 26 together with the inflator 21. The case 19 is provided with a peripheral wall portion 19a and a bottom wall portion 19d. The peripheral wall portion 19a is formed into a generally rectangular tubular shape and has the opening 17, which faces toward the rear of the vehicle. The bottom wall portion 19d is formed into a generally rectangular shape to close the front end of the peripheral wall portion 19a. On the peripheral edge of the opening 17 at the peripheral wall portion 19a, there is a flange portion 19b. The flange portion 19b is connected to the holding member 12. In the upper part of the peripheral wall portion 19a toward the front side of the vehicle, there are a plurality of (or two in the embodiment) of mounting holes 19c. The mounting holes 19c are used when the inflator 21 and the airbag 26 are mounted in the case 19. The peripheral wall portion 19a has an axis O, which extends in the axial direction of the steering column 3, as shown in FIG. 1.

As shown in FIGS. 1 to 5, the inflator 21 is provided with a cylindrical body 22 and two brackets 23 and 23. The body 22 discharges the inflating gas G when an electric signal is inputted. The body 22 is provided with a gas discharge port 22a for discharging the inflating gas G. The body 22 is activated in response to the electric signal coming from an unillustrated control device. The control device also activates an unillustrated airbag device mounted on the steering wheel 1. In other words, the body 22 acts simultaneously with an airbag device for the steering wheel. Each bracket 23 is composed of a holding ring 23a made of a sheet metal and a bolt 23b protruding from the holding ring 23a. The holding ring 23a is mounted on the body 22 by fitting it around the body 22 and by deforming it plastically to a smaller diameter. The inflator 21 is arranged in the airbag 26. The individual bolts 23b are fitted in mounting holes 29 of the airbag 26 and in the individual mounting holes 19c of the case 19, and nuts 24 are fastened on the individual bolts 23b. As a result, the inflator 21 is mounted and fixed together with the airbag 26 in the case 19. The unillustrated lead wires are connected with the body 22.

The case 19 may be formed integrally with the holding member 12. Specifically, the case 19 and the holding member 12 may be integrally formed by pressing or welding with a metallic material such as sheet metal or by die-casting with a material of a light alloy of aluminum.

The airbag 26 is made of a flexible sheet of woven fabric of polyester or polyamide and formed to have a generally rectangular shape upon completion of the extension and expansion, as shown in FIGS. 2 and 4 to 6. In the case of the illustrated embodiment, the airbag 26 is formed of two generally rectangular sheets of woven fabric: a front wall portion 27, which faces the column cover 8; and a rear wall portion 28, which faces the passenger D. The airbag 26 is formed by sewing the peripheral edges of the wall portions 27 and 28 to each other. The mounting holes 29 are formed in the lower part of the rear wall 27. Into each of these holes 29, there is inserted a bolt 23b of the inflator 21. On the other hand, the rear wall portion 28 is provided with a central portion 28a and joining positions 28c. The central portion 28a is positioned near the transverse center of the airbag 26 and includes a lower central portion 28b. The lower central portion 28b is located at the rear side of the inflator 21. The joining positions 28c and 28c are located more to the center than the left and right edges of the airbag 26 when extended flat, and are located near the central portion 28a on the left and right sides.

The airbag 26 of the illustrated embodiment is divided into a lower expansion portion 30 and an upper expansion portion 31. The lower expansion portion 30 is located below the position of a tether 32 and on the side housing the inflator 21. The upper expansion portion 31 is formed to extend to the upper side of the lower expansion portion 30 and is located above the position of the tether 32. The lower expansion portion 30 is located at the upstream side of the inflating gas flow G. The lower expansion portion 30 protrudes from the opening 17 of the case 19 toward the rear of the vehicle and covers the opening 17 and its periphery, with the face 13a (as referred to in FIG. 1) of the airbag cover 13 toward the rear of the vehicle. Therefore, the lower expansion portion 30 covers the front of the knees K (KL and KR) of the driver D or the passenger. On the other hand, the upper expansion portion 31 communicates with the lower expansion portion 30 and is located at the downstream side of the inflating gas flow G. The upper expansion portion 31 protrudes upward from the lower expansion portion 30 along the rear face 8a of the column cover 8. The upper expansion portion 31 can cover the periphery of the opening 17 and at least the vicinity of the upper end 8b on the column cover rear face 8a. Here in the case of the illustrated embodiment, the lower expansion portion 30 when extending and expanding has a larger transverse dimension than that of the opening 17 so that it can protect the two knees KL and KR of the driver D sufficiently.

Figure 4:
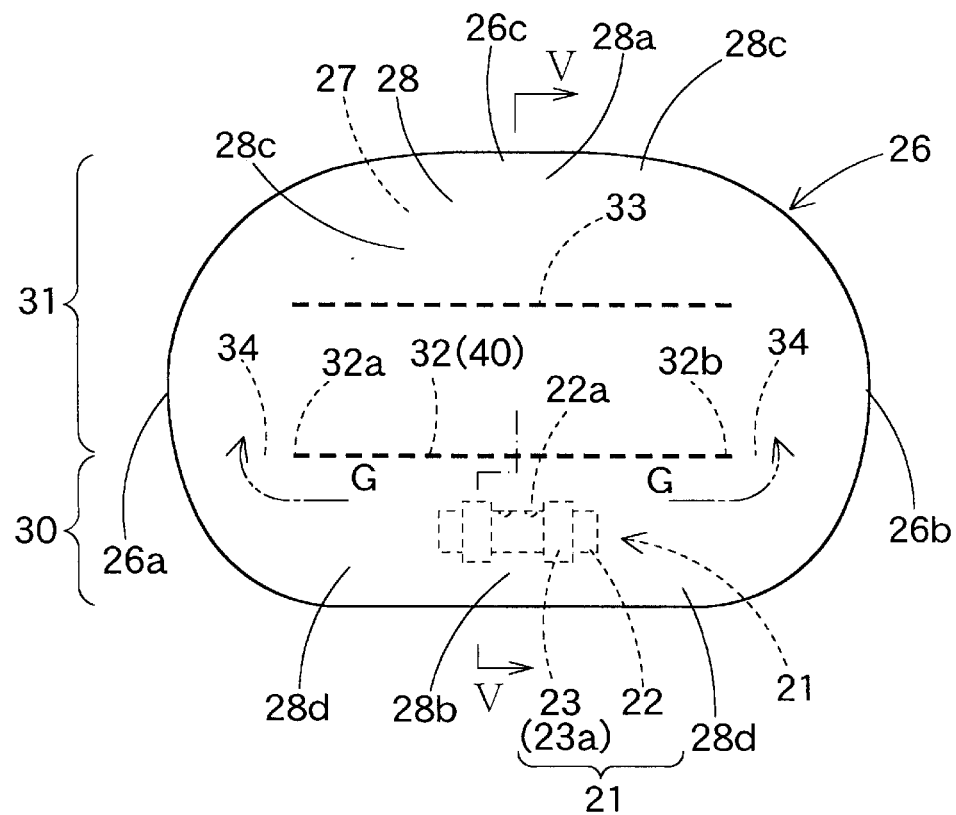
FIG. 4 is a front view of the airbag used in the first embodiment when it is extended and expanded.
Figure 5:
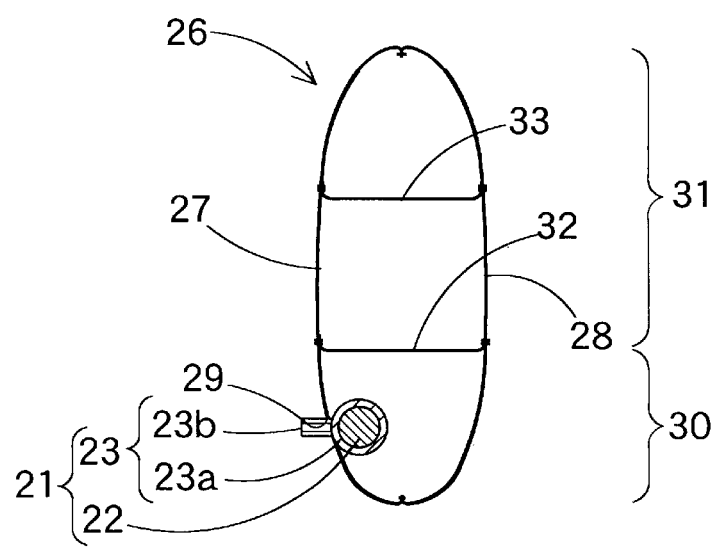
FIG. 5 is a schematic section taken along line V—V of FIG. 4.

Within the airbag 26, there are arranged the tethers 32 and 33, which connect the vehicle side wall, or front wall, portion 27, and the passenger side wall, or rear wall portion 28, to each other, as shown in FIGS. 4 and 5. The tethers 32 and 33 act as thickness regulating means for making the thickness of the lower expansion portion 30 and the upper expansion portion 31 constant when extending and expanding. The airbag 26 is enabled by the thickness regulating means to fit smoothly into the clearance between the knees K of the driver D and the column cover rear face 8a. Like the wall portions 27 and 28 of the airbag 26, the tethers 32 and 33 are made of a flexible material and are sewn to the wall portions 27 and 28. In the case of the illustrated embodiment, the tethers 32 and 33 are individually arranged generally in the transverse direction of the vehicle above the inflator 21. The rightmost and leftmost ends or the tethers 32 and 33 are spaced from the two left and right edges 26a and 26b of the airbag 26. The tether 32 performs a role not only as the thickness regulating means but also as a gas flow guide member. Specifically, the gas flow guide member 32 guides the inflating gas G discharged from the inflator 21 to the upper expansion portion 31 while also deflecting it to the two transverse ends 26a and 26b of the airbag 26.

More specifically, the tether 32 is arranged along the transverse direction of the vehicle to block the area above the inflator 21. The tether 32 provides gas communication ports 34 between its left end 32a and the left edge 26a of the airbag and between its right end 32b and the right edge 26b of the airbag. When the inflating gas G flows in the upper expansion portion 31, which is downstream, therefore, it flows, as discharged from the inflator 21, leftward and rightward and then upward in the lower expansion portion 30, which is upstream.

As a result, at the initial stage of the extension and expansion of the airbag 26 and before completion of the extension and expansion of the upper portion 31, the lower portion 30 can widely cover to the left and right of the opening 17. In other words, the tether 32, which serves as the gas flow guide member, deflects the upstream flow of the inflating gas G leftward and rightward, and acts as extension means 40 for extending to the left and right of the opening 17 at the initial stage of the extension and expansion of the airbag 26.

Further, the airbag 26 is provided with, in addition to the extension means 40, which is a first extension means, a second extension means 41 for extending to the left and right of the opening 17 at the initial stage of the extension and expansion. The second extension means 41 is the folded shape of the airbag 26. By the second extension means 41, the airbag 26 is enabled to widely cover the areas to the right and left of the opening 17 when unfolding during extension and expansion.

The second extension means 41 makes it easy to extend the lower portion 30 leftward and rightward upon the extension from the folded state. In the case of the illustrated embodiment, the airbag 26 is folded through the following vertical folding step and transverse folding step.

At the vertical folding step, as shown in FIGS. 6A to 6D, the airbag 26 is folded in directions perpendicular to the transverse directions of the vehicle to reduce the transverse dimension of the airbag 26. At this vertical folding step, the rear wall 28 is folded over the front wall 27 and extended flat, the two left and right edges 26a and 26b are folded close enough to the central portion 28a that the airbag 26 has the transverse dimension B1 needed to be housed in the case 19. At the vertical folding step, the extension means 41 is a fold that the folded portions 37 and 37 are arranged on the side of the front wall 27 at the positions of the left and right joining positions 28c and 28c of the rear wall 28. The folded portions 37 and 37 on the two left and right edge sides of the airbag 26 are folded by rolling the two left and right edges 26a and 26b over the front wall 27, or folded up in the form of bellows.

The transverse folding step is performed after the vertical folding step to fold the airbag 26 transversely. At the transverse folding step, as shown in FIGS. 6D and 6E, the vertically folded airbag 26 is folded to bring its upper edge 26c closer to the position of the inflator 21. A folded portion 38 is formed to have a vertical dimension V1 (as shown FIG. 7B) to allow the airbag 26 to be housed in the case 19.

Installation of the knee protecting airbag device M1 on the vehicle is as follows. First, the airbag 26 is folded while housing the inflator 21 therein. At this time, the individual bolts 23b of the inflator 21 are protruded from the mounting holes 29. The unillustrated lead wires leading from the body 22 are extracted from the predetermined unillustrated through holes in the airbag 26.

In the case of the illustrated embodiment, the airbag 26 is folded in the aforementioned two steps, i.e., the vertical folding step and the transverse folding step.

Figure 6A:
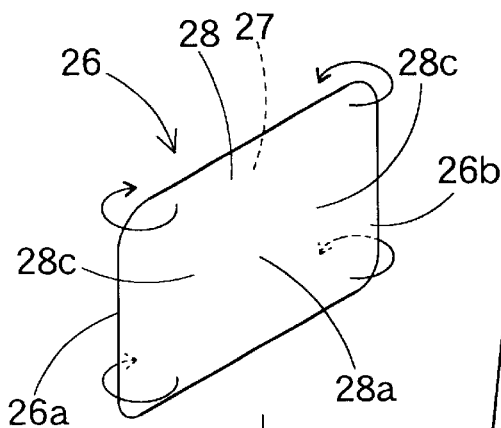
FIGS. 6A to 6E are schematic views showing stages of folding the airbag of the first embodiment.
Figure 6B:
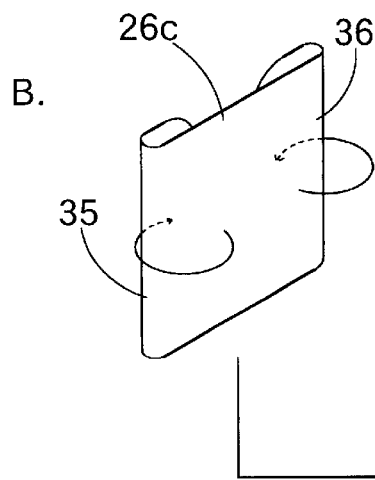
Figure 6C:
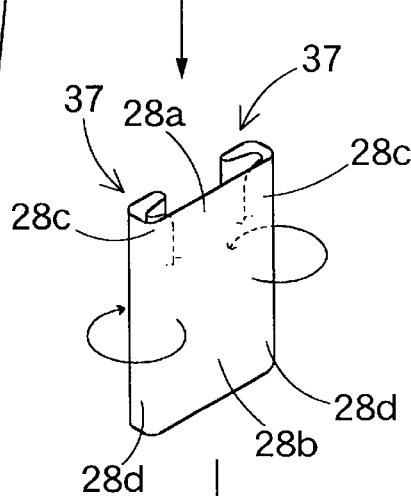
Figure 6D:
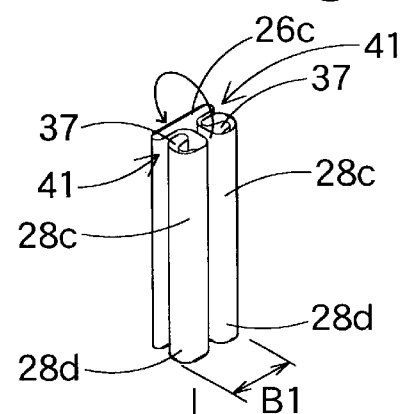
Figure 6E:
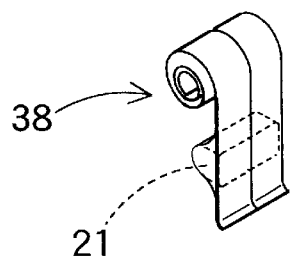

At the vertical folding step, from the state in which the rear wall 28 is applied to and extended flat on the front wall 27, as shown in FIG. 6A, the two left and right edges 26a and 26b of the airbag 26 are brought toward the central portion 28a of the rear wall 28, as shown in FIG. 6B. In the illustrated embodiment, the two left and right edges 26a and 26b are then individually folded toward the side of the front wall 27. As shown in FIG. 6C, the two left and right edges 35 and 36 of the folded airbag 26 are brought toward the central portion 28a of the rear wall 28. In the case of the illustrated embodiment, the two edges 35 and 36 are individually folded toward the side of the front wall 27 to form the folded portions 37. Next, the airbag 26 is folded to have the transverse housing dimension B0 (as shown in FIG. 3) of the case 19, as shown in FIG. 6D. In the case of the illustrated embodiment, the vertical folding step of the airbag 26 is completed by placing the folded portions 37 at the central portion 28a of the rearwall 28. At this time, the folded portions 37 are placed on the side of the front wall 27 at the positions of the left and right joining positions 28c of the rear wall 28.

Figure 7A:
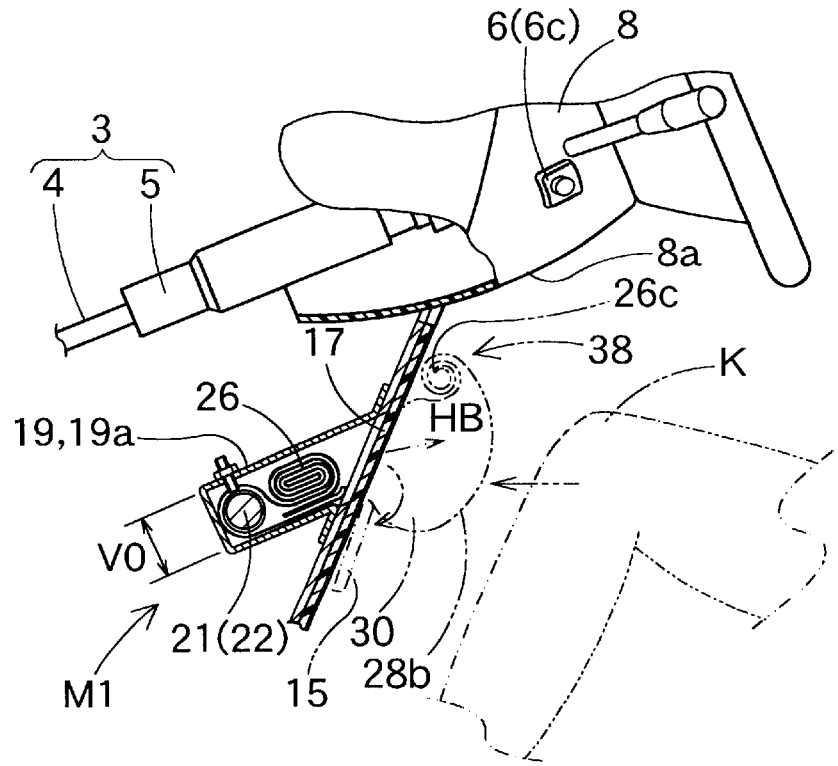
FIGS. 7A and 7B are schematic longitudinal sections illustrating the extension and expansion of the airbag of the first embodiment.

At the transverse folding step after the vertical folding step, the airbag 26 is folded to the height V0 (as shown in FIG. 7A) of the case 19, as shown in FIGS. 6D and 6E. In the illustrated embodiment, the airbag 26 is folded by rolling the upper edge 26c toward the front wall 27. As a result, the transverse folding step is completed, which completes the folding operation of the airbag 26.

After the airbag 26 is folded, it is wrapped with the unillustrated wrapping film, which can be broken upon expansion of the airbag 26. The wrapping film prevents the bag from becoming loose during storage. Next, the inflator 21 and airbag 26 are put in the case 19, and the individual bolts 23b are protruded through the wrapping film from the mounting holes 19c of the case 19. The nuts 24 are then fastened on the individual protruded bolts 23b, and the inflator 21 and the airbag 26 are housed and fixed in the case 19. The unillustrated lead wires leading from the body 22 of the inflator 21 are passed through the wrapping film and from the unillustrated through holes of the case 19.

Then, the flange portion 19b of the case 19 is fixed on the holding member 12, and the holding member 12 is fixed at its two transverse ends on the frame portions FL and FR of the vehicle individually by means of the bolts. Next, the unillustrated lead wires are connected with the control circuit, and the dashboard 10 and other parts are mounted on the vehicle. Then, the airbag device M1 can be mounted on the vehicle, as shown in FIGS. 1 to 3.

If the predetermined electric signal is inputted to the inflator body 22 after the airbag device M1 is mounted on the vehicle, the inflating gas G is discharged from the gas discharge port 22a. Then, the airbag 26 expands to protrude toward the rear of the vehicle while breaking the unillustrated wrapping film and pushing and opening the door portion 15 of the airbag cover 13. The airbag 26 extends and expands upward along the column cover rear face 8a while unfolding itself transversely and vertically.

In the first embodiment, at the initial stage of the extension and expansion, the airbag 26 is pushed by the inflating gas G discharged from the inflator 21, so that the lower central portion 28b of the rear wall 28 opposite the inflator 21 protrudes toward the driver D, toward the rear HB of the vehicle. As the lower central portion 28b protrudes, the folded portions 38 and 37 move toward the rear HB of the vehicle to break the breakaway portion 14, which opens the door portion 15 of the airbag cover 13.

Figure 8A:
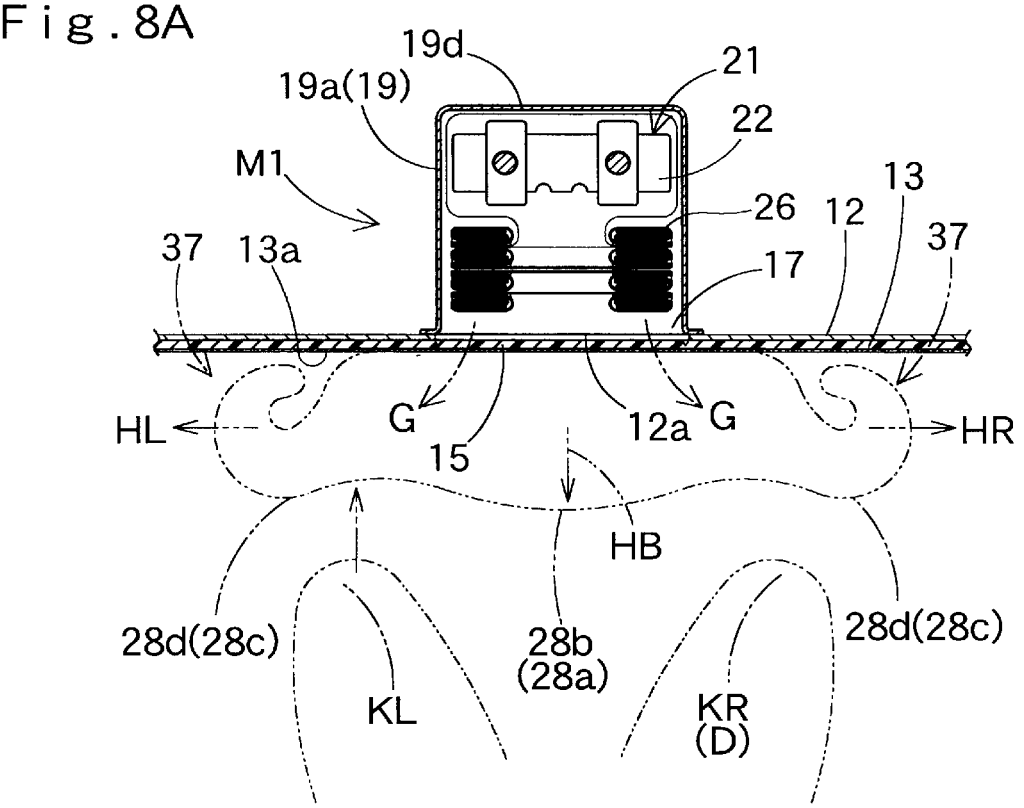
FIGS. 8A and 8B are schematic horizontal sections illustrating the extension and expansion of the airbag of the first embodiment.
Figure 8B:
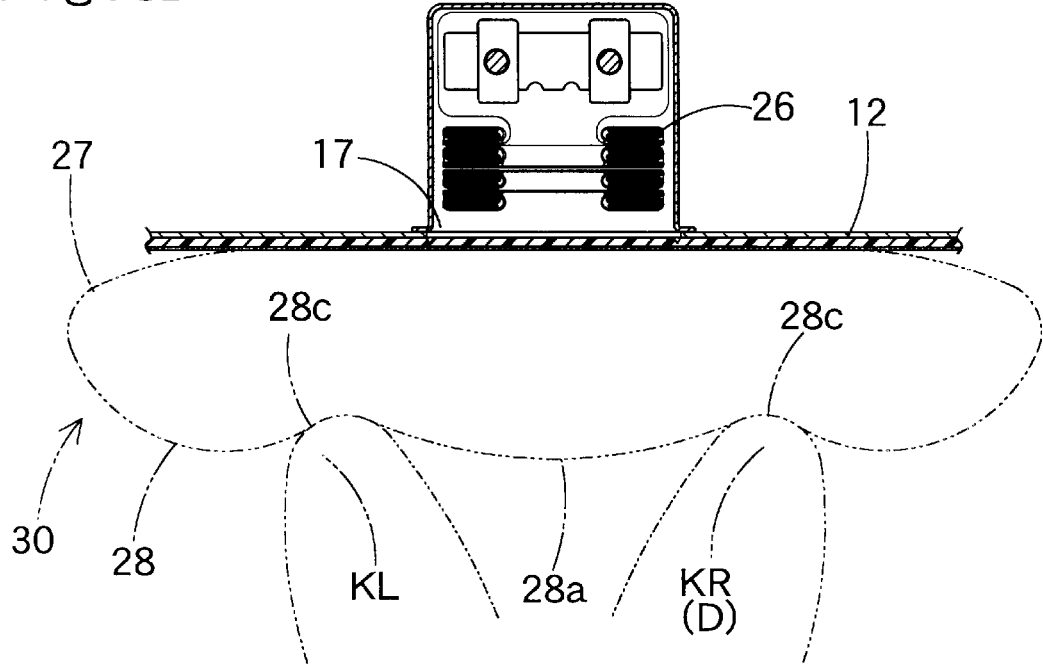

Simultaneously, lower joining positions 28d of the joining positions 28c leading to the lower central portion 28b also protrude toward the driver D (as shown in FIG. 8A) As the inflating gas G flows in, the folded portions 37 and 37 near the lower joining positions 28d are unfolded. At this time, the folded portions 37 are individually arranged when vertically folded on the side of the front wall 27 at the left and right joining positions 28c of the rear wall 28. Therefore, when the folded portions 37 near the lower joining positions 28d are unfolded, their protrusion toward the driver D is minimized. As shown in FIGS. 8A and 8B. More specifically, the folded portions 37 are unfolded by the extension means 41 while being directed from the lower joining positions 28d to the column cover 8 (or to the holding member 12) and while being widely extended leftward HL and rightward HR. Then, the lower extension portion 30 of the airbag 26 completes the extension and expansion.

Figure 7B:
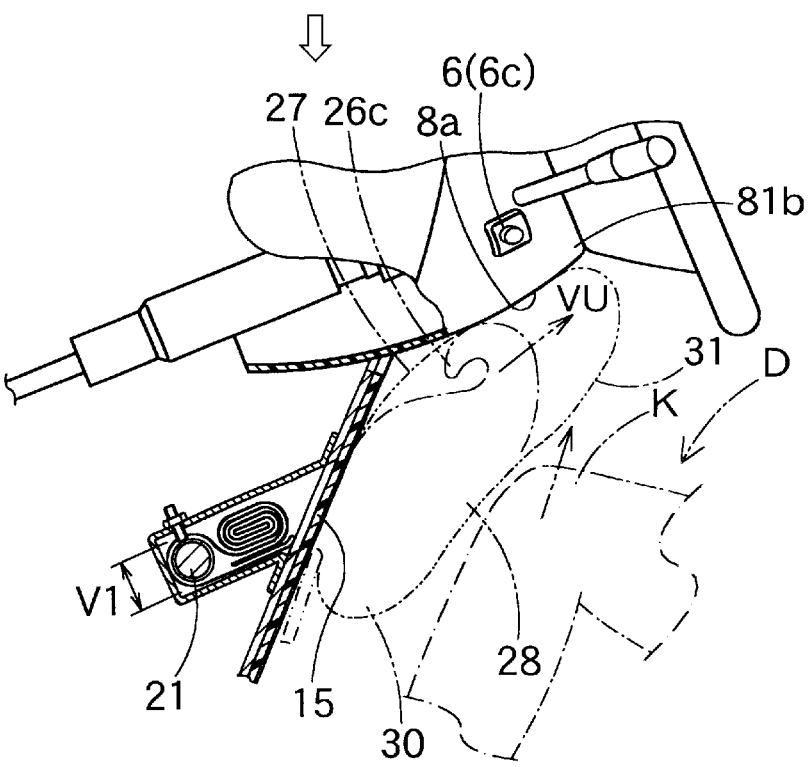
Figure 9A:
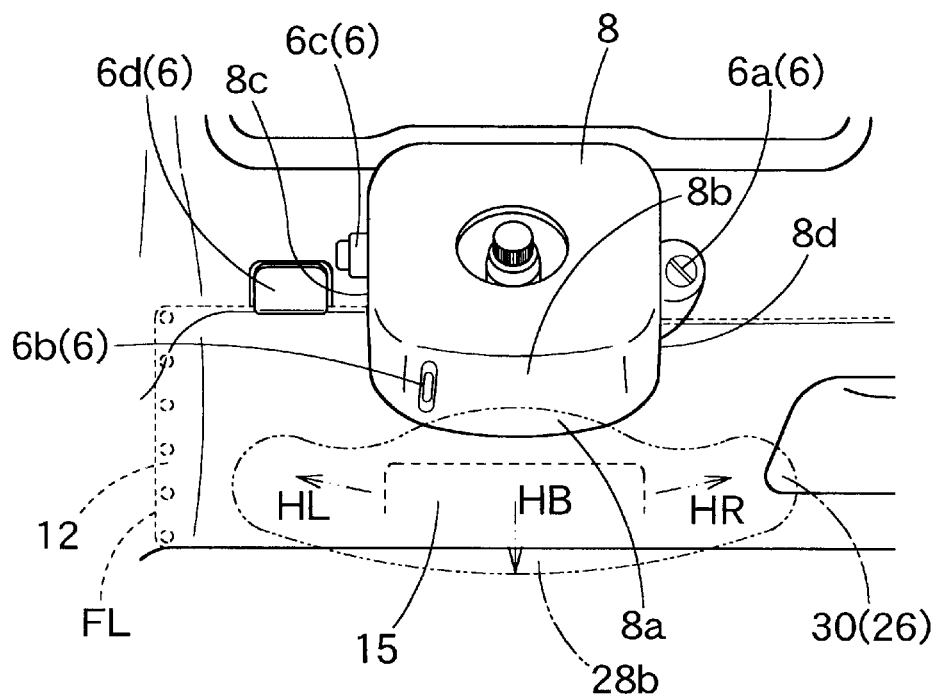
FIGS. 9A and 9B are schematic compartment front views taken from the rear side of the vehicle illustrating the extension and expansion of the airbag of the first embodiment.
Figure 9B:
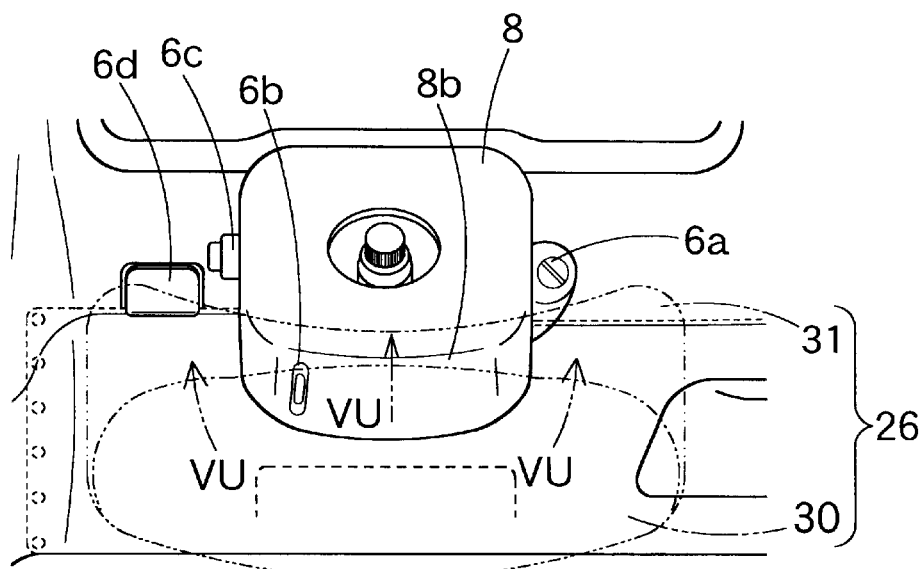

The protrusion of the central portion 28a of the rear wall 28 toward the driver D occurs in an upward direction VU from the lower central portion 28b. In other words, the folded portions 37 are unfolded in the upward direction VU from the vicinity of the lower joining positions 28d. Specifically, the transversely folded portion 38 is extended and expanded along the rear face 8a of the column cover 8 while being unfolded, as shown in FIGS. 7B and 9B. In this way the upper expansion portion 31 of the airbag 26 also completes its extension and expansion.

In the knee protecting airbag device M1 of the first embodiment thus far described, when the airbag 26 is extending and expanding, the lower expansion portion 30 protrudes toward the rear HB of the vehicle from the opening 17 of the case 19 to cover the front sides of the two knees KL and KR of the driver D. The upper expansion portion 31 protrudes in the upward direction VU, from the lower expansion portion 30 along the rear face 8a of the column cover 8, and covers the portion of the airbag cover 13 above the opening 17 and at least the vicinity of the upper end 8b on the side of the column cover rear face 8a.

Just after the action of the knee protecting airbag device M1, the vehicle makes a front collision. Therefore, the knees KL and KR of the driver D move forward relative to the vehicle. At this time, the lower expansion portion 30 is located at the upstream part of the flow of the inflating gas G so that the lower expansion portion 30 protrudes toward the rear HB of the vehicle from the opening 17 and expands prior to the upper expansion portion 31, as shown in FIGS. 7A, 8A, 8B and 9B. Even if the knees KL and KR of the driver D move forward relative to the vehicle, therefore, the lower expansion portion 30 can protect the knees KL and KR of the driver D properly.

If the driver D then moves forward relative to the vehicle while his or her toes are still on the floor panel, the knees K (KL and KR) are bent to rise to the positions K(U) (as shown in FIG. 1). In other words, the knees K (KL and KR) get out of position to the vicinity of the upper end 8b on the sides of the column cover rear face 8a. This state takes place regardless of whether the knees KL and KR contact the airbag 26 or not. At this time, the airbag 26 has already passed through the initial stage of the extension and expansion, and its upper expansion portion 31, at the downstream part of the inflating gas G flow, extends in the upward direction VU from the lower expansion portion 30 along the column cover rear face 8a and expands to cover the portion of the airbag cover 13 above the opening 17 and at least the vicinity of the upper end 8b on the side of the column cover rear face 8a. Therefore, the knees KL and KR, while moving upward, can be properly protected by the upper expansion portion 31. In other words, the upper expansion portion 31 of the airbag 26 can protect the knees KL and KR against hard members 6 such as the key cylinder 6a and the control portions 6b and 6c, even if those hard members 6 are arranged on the side of the rear face 8a of the column cover 8.

In the knee protecting airbag device M1 thus far described, the expansions of the lower expansion portion 30 and the upper expansion portion 31 are completed according to predicted movement of the knees KL and KR of the driver D, and the expansion mode of the airbag 26 expanding progressively with time from the start to the completion of the extension and expansion is set. In other words, the extension and expansion do not enlarge the protection area of the airbag 26 right at the beginning of the expansion. Therefore, the knees KL and KR of the driver D can be properly protected without using a high-output inflator and without an airbag of a large volume.

In the knee protecting airbag device M1 of the first embodiment, therefore, as the time elapses from the start to the completion of the extension and expansion of the airbag 26, the airbag 26 can be efficiently extended and expanded progressively to protect the knees KL and KR of the driver D properly.

In the first embodiment, there are arranged within in the airbag 26 the tethers 32 and 33 which connect the front wall 27 and the rear wall 28. The tethers 32 and 33 regulate the thickness of the lower expansion portion 30 and the upper expansion portion 31 during the airbag expansion. Therefore, the lower expansion portion 30 is enabled by the tether 32 to restrain the distance (or the thickness of the lower expansion portion 30) between the front wall 27 and the rear wall 28 when expanding. In other words, the inflating gas G flows to the upper expansion portion 31 without filling the lower expansion portion 30 more than necessary, so that the airbag 26 can promote the expansion completion of the upper expansion portion 31. Of course, the lower expansion portion 30 is kept thin when extended and expanded, and not excessively thick. As a result, the lower expansion portion 30 is smoothly deployed, even if the space between the column cover rear face 8a and the knees KL and KR of the driver D is narrow.

In the airbag device M1 of the first embodiment, the folded portion 38 of the airbag 26 is folded by rolling the upper edge 26c of the airbag 26 toward the front wall 27. During the transverse unrolling of the folded portion 38, therefore, the airbag 26 is extended and expanded along the column cover rear face 8a while unrolling the portion by the upper edge 26c of the airbag 26, as shown in FIGS. 7A and 7B, and completes the extension and expansion, as indicated by double-dotted lines in FIG. 1. When unfolding, the airbag 26 comes as close to the rear face 8a of the column cover as possible. The airbag 26 of the illustrated embodiment can be smoothly extended as though it were unrolling, even if it contacts the knees K of the driver.

In the case of the first embodiment, the airbag 26 is provided with the extension means 40 and 41 for widely covering to the left and right of the opening 17 at the initial stage of the extension and expansion.

In the airbag 26, specifically, there is arranged the tether 32 which acts as the gas flow guide member of the extension means 40. When the inflator 21 acts to discharge the inflating gas G, therefore, the inflating gas G flows in the airbag lower expansion portion 30 to the gas communication ports 34 located on the left and right sides of the tether 32, as indicated by arrows in FIG. 4, to extend the airbag lower expansion portion 30 leftward and rightward, to complete the expansion. As a result, at the initial stage of the extension and expansion of the airbag 26, the lower expansion portion 30 extends leftward and rightward HL, HR to complete the extension and expansion. Therefore, the lower expansion portion 30 widely covers to the left and right of the opening 17. When the lower expansion portion 30 of the airbag 26 extends and expands leftward HL and rightward HR from the opening 17, the lower expansion portion 30 can properly protect the knees KL and KR of the driver D even if the knees K (KL and KR) are moved a great deal leftward and rightward by braking forces.

The airbag 26 is folded in the folding shape of the extension means 41. At the vertical folding step for narrowing the transverse dimension of the airbag 26, specifically, the folded portions 37 on the left and right sides 26a and 26b of the airbag 26 are individually folded to the side of the front wall 27 at the positions of the left and right joining positions 28c and 28c of the rear wall 28. As shown in FIGS. 8A and 8B, therefore, the folded portions 37 are unfolded by the extension means 41 while being directed from the lower joining positions 28d toward the column cover 8 (or toward the holding member 12) and while being widely extended leftward HL and rightward HR. At the initial stage of the extension and expansion of the airbag 26, the lower expansion portion 30 of the airbag 26 extends and expands leftward HL and rightward HR from the opening 17. At the initial stage of the extension and expansion, therefore, the knees K (KL and KR) of the driver D can be properly protected by the lower expansion portion 30 even if they are moved a great deal by braking forces.

In the knee protecting airbag device M1 of the first embodiment, the tether 32 is used to cause the gas flow to widely extend the airbag 26 transversely at the initial stage of the expansion. If the lower expansion portion 30 of the airbag 26 easily extends transversely, however, the tether 32 need not be used for this. Instead, the gas discharge port 22a of the inflator 21 may be directed to the two transverse sides of the vehicle to discharge the inflating gas G to the two transverse sides.

Figure 10:
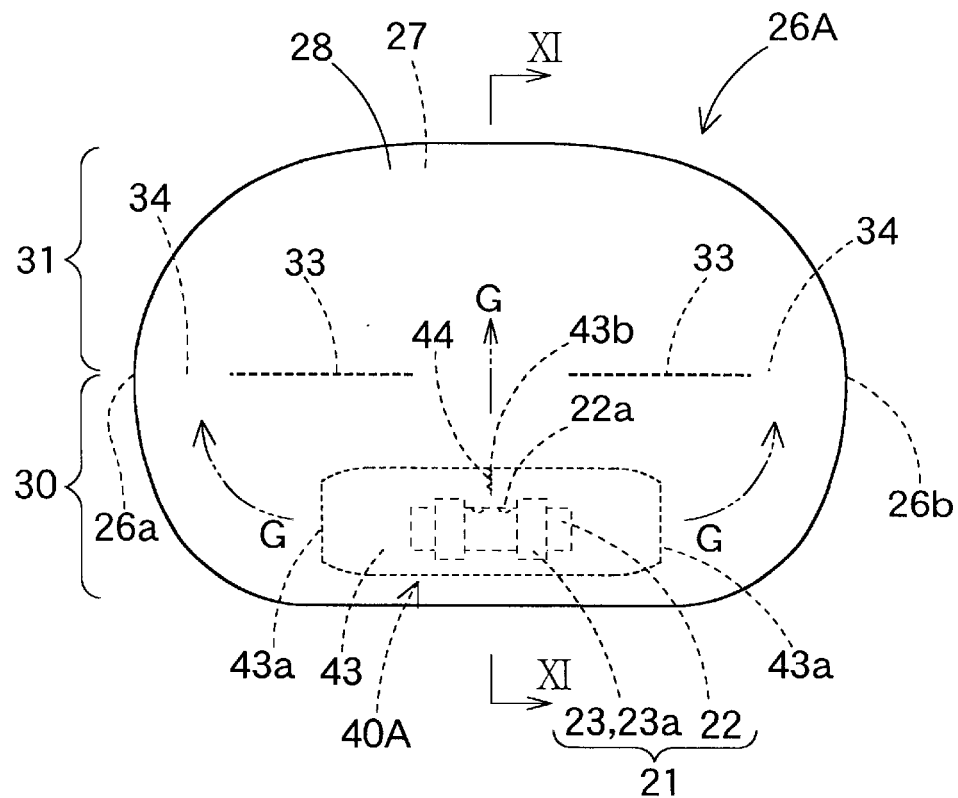
FIG. 10 is a front view of an airbag of a modification of the airbag of the first embodiment, when extended and expanded.
Figure 11:
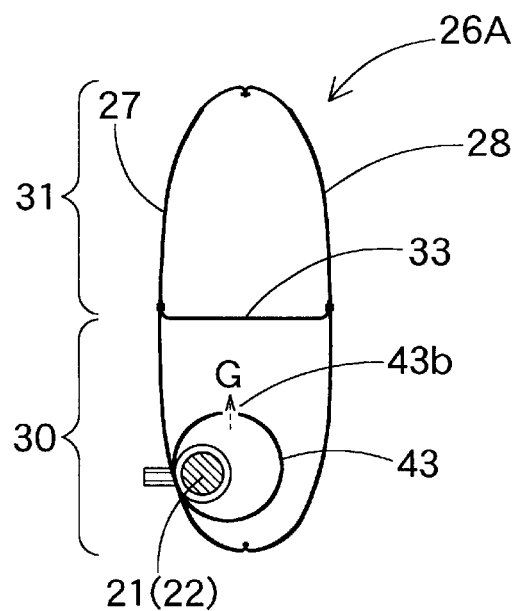
FIG. 11 is a schematic section taken along line XI—XI of FIG. 10.

As shown in FIGS. 10 and 11, extension means 40A may be formed by providing a gas flow guide member 43 around the inflator 21 of an airbag 26A.

The gas flow guide member 43 is formed into a generally tubular shape and made of a woven fabric that is flexible like the material of the airbag 26. Openings 43a and 43a in the transverse directions are narrowed to have a smaller diameter than that of the axially central portion of the gas flow guide member 43. On the upper side near the transverse center of the gas flow guide member 43, a slitted auxiliary opening 43b is formed. The auxiliary opening 43b is sewn with a breakable sewing thread 44 so that it is opened when the sewing thread 44 is broken.

In the airbag 26A, the openings 43a on the two transverse ends of the gas flow guide member 43 are narrow just after the action of the inflator 21, i.e., at the initial stage of the extension and expansion of the airbag 26A. Therefore, the inflating gas G from the inflator 21 fills the inside of the gas flow guide member 43 and is fed out toward the two transverse sides from the left and right openings 43a. At this time, the lower expansion portion 30 of the airbag 26A is completely expanded toward the two transverse sides. At the initial stage of the extension and expansion of the airbag 26A, therefore, the lower expansion portion 30 extends leftward and rightward, to complete the extension and expansion, and covers the areas to the left and right of the opening 17 to cushion the front sides of the knees K (KL and KR).

The inflating gas G that has passed through the gas communication ports 34 fills the inside of the upper expansion portion 31. Therefore, the upper expansion portion 31 rises along the rear face 8a of the column cover 8 and completes the extension and expansion by covering the periphery of the opening 17 and at least the vicinity of the upper end 8b of the column cover rear face 8a. At this time, the inflating gas G fills the inside of the gas flow guide member 43. Therefore, the sewing thread 44 is broken to open the auxiliary opening 43b, and the inflating gas G flows linearly out from the auxiliary opening 43b upward and into the upper expansion portion 31. As a result, the inflating gas G from the auxiliary opening 43b promotes the upward extension and expansion of the upper expansion portion 31. The tethers 33 are spaced in the transverse direction from the left and right edges 26a and 26b of the airbag 26A. In other words, the tethers 33 define the gas communication ports 34 between the tethers 33 and the two transverse edges 26a and 26b of the airbag 26A. The two tethers 33 are spaced apart from each other in the transverse direction. Therefore, the inflating gas G from the auxiliary opening 43b flows smoothly into the upper portion 31 of the airbag 26A. In the airbag 26A, the auxiliary opening 43b is not opened from the initial stage of the inflow of the gas G. In the airbag 26A, therefore, the inflating gas G can be fed from the auxiliary opening 43b to the upper expansion portion 31 by opening the auxiliary opening 43b after the lower expansion portion 30 is properly extended and expanded in the transverse direction.

Here in the knee protecting airbag device M1 of the first embodiment, the airbag 26 has a contour shape that is wide in the transverse direction when extending and expanding. Therefore, the airbag 26 can cover the lower side of a parking release lever 6d (as referred to FIG. 2). The lever 6d is a hard member 6 of the dashboard 10. Therefore, the airbag 26 can protect the knees K of the driver D over a wide range. The dashboard 10 is also one of the members attached to the vehicle body together with the column cover 8.

Figure 12:
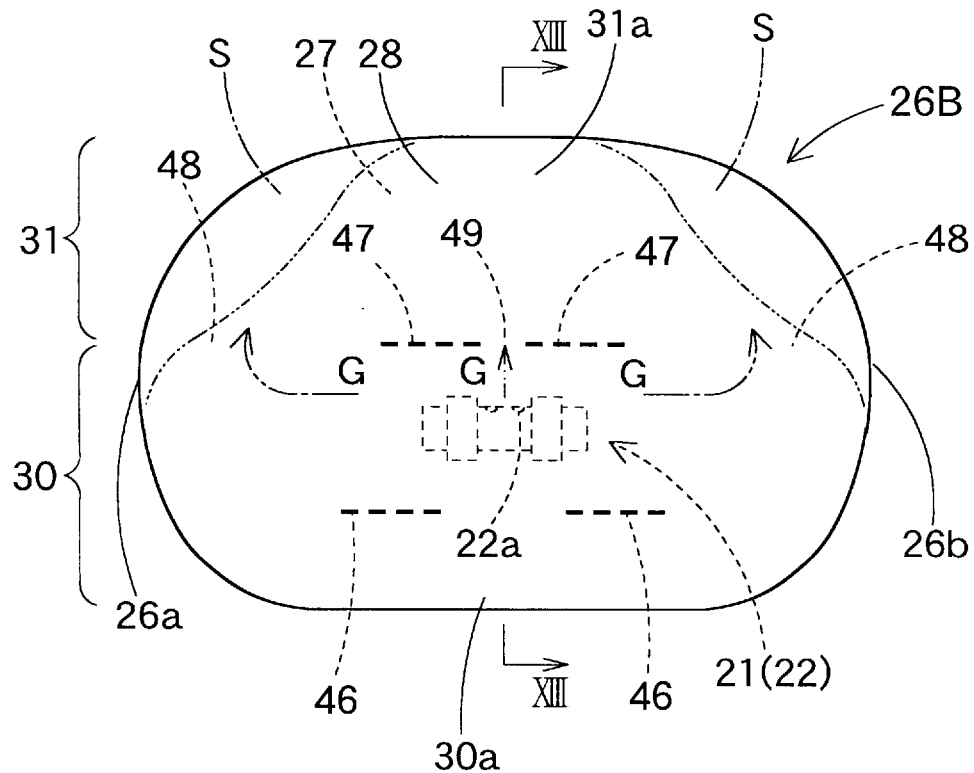
FIG. 12 is a front view of an airbag used in a second embodiment when extended and expanded.
Figure 13:
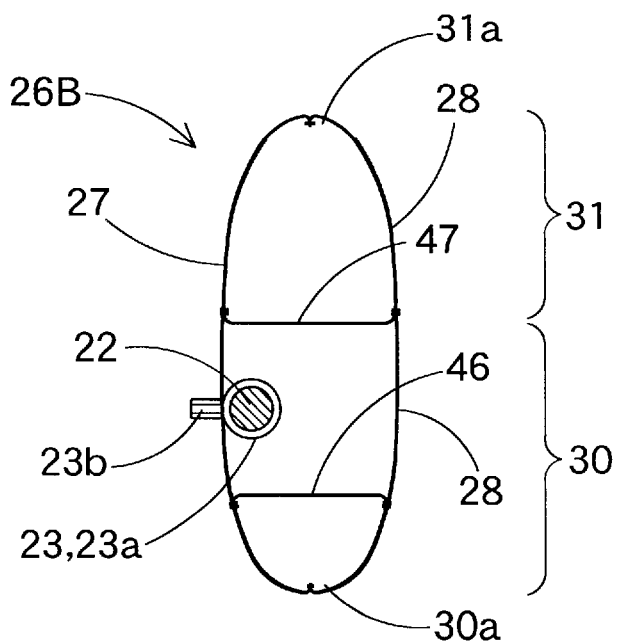
FIG. 13 is a schematic section taken along line XIII—XIII of FIG. 12.

In a knee protecting airbag device M2 of a second embodiment shown in FIGS. 12 to 14, the construction may be modified such that the expansion of the upper expansion portion 31 is promoted by feeding the inflating gas G in a direct line into the upper expansion portion 31. In the airbag device M2, tethers 46 and 47 of an airbag 26B are different in their arrangement from the tethers 32 and 33. Moreover, the airbag device M2 is constructed such that the lower end 30a of the lower expansion portion 30 covers the rear-facing face 13a of the airbag cover 13 widely below the opening 17. The remaining constructions of the airbag device M2 are similar to those of the first embodiment. Therefore, members that are the same as those of the first embodiment will not be described and will be designated by the same reference numerals as those of the first embodiment.

Here in the airbag 26B, the portions below the tethers 47 and 47 constitute the lower expansion portion 30, and the portions above the tethers 47 constitute the upper expansion portion 31.

In the airbag 26B, the tethers 46 and 47 connecting the front wall 27 and the rear wall 28 are arranged to regulate the thickness of the lower and upper expansion portions 30 and 31. The tethers 46 and 47 are arranged in the transverse directions of the vehicle and on the upper and lower sides of the inflator 21. The tethers 47 arranged on the upper side are spaced in the transverse direction from each other to form a gas communication port 49. Therefore, the inflating gas G from the lower expansion portion 30 is guided to the upper expansion portion 31 from three passages, i.e., two outer gas communication ports 48 and the central gas communication port 49. The gas communication ports 48 are located between the left and right edges 26a and 26b of the airbag 26B and the end portions of the respective tethers 47 in the transverse directions of the vehicle. In the airbag 26B, the gas G is guided to the upper expansion portion 31 from the three portions, i.e., the gas communication ports 48 and the gas communication port 49. Therefore, the upper expansion portion 31 protruding along the column cover rear face 8a promotes the expansion completion.

The airbag 26B is folded like the airbag 26 through a vertical folding step and a transverse folding step. At the transverse folding step, the sides of the upper end 31a and the lower end 30a of the airbag 26B are respectively rolled closer to the inflator 21.

Figure 14A:
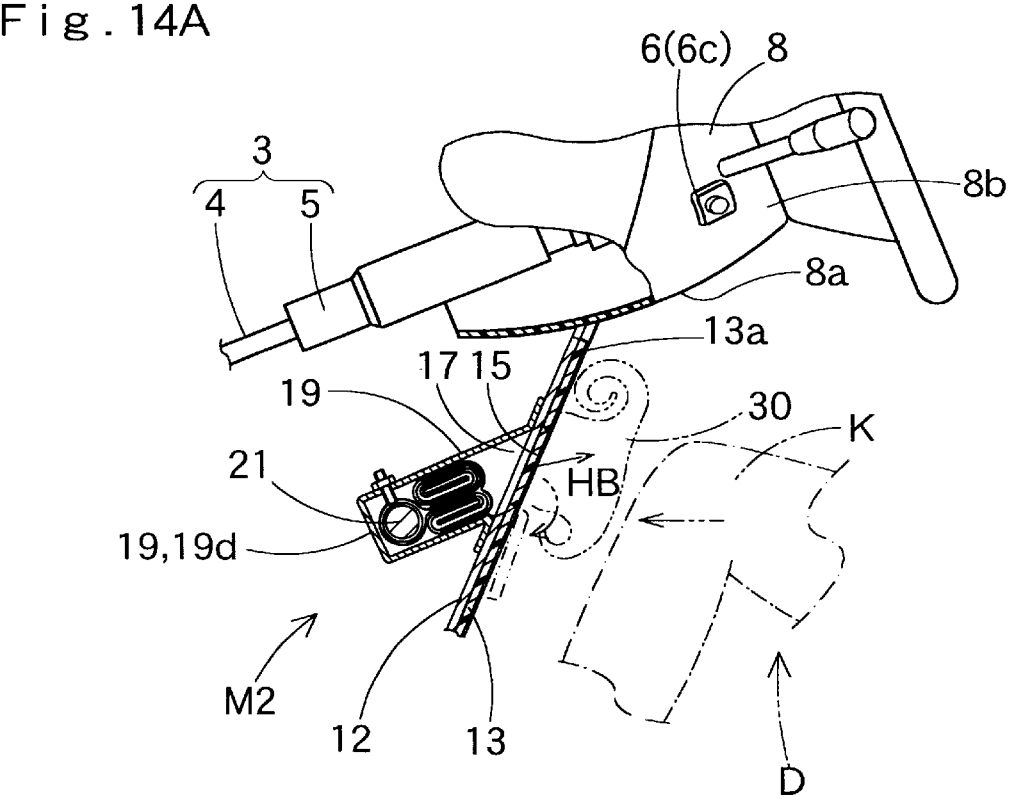
FIGS. 14A and 14B are schematic longitudinal sections illustrating the state of the airbag of the second embodiment when extending and expanding.
Figure 14B:
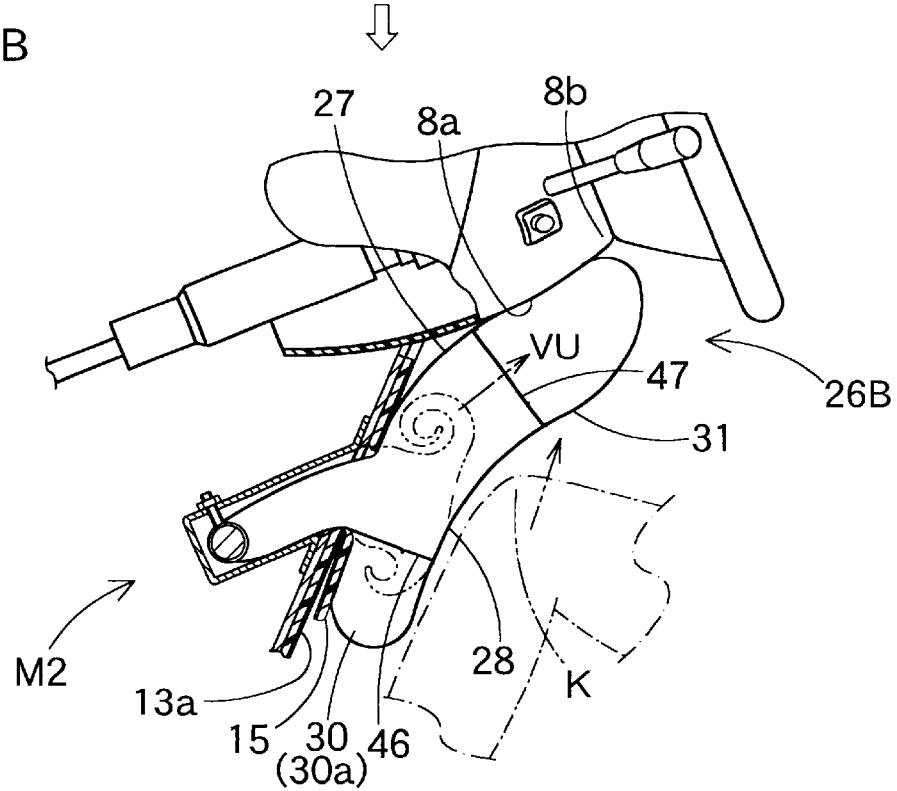
Figure 15:
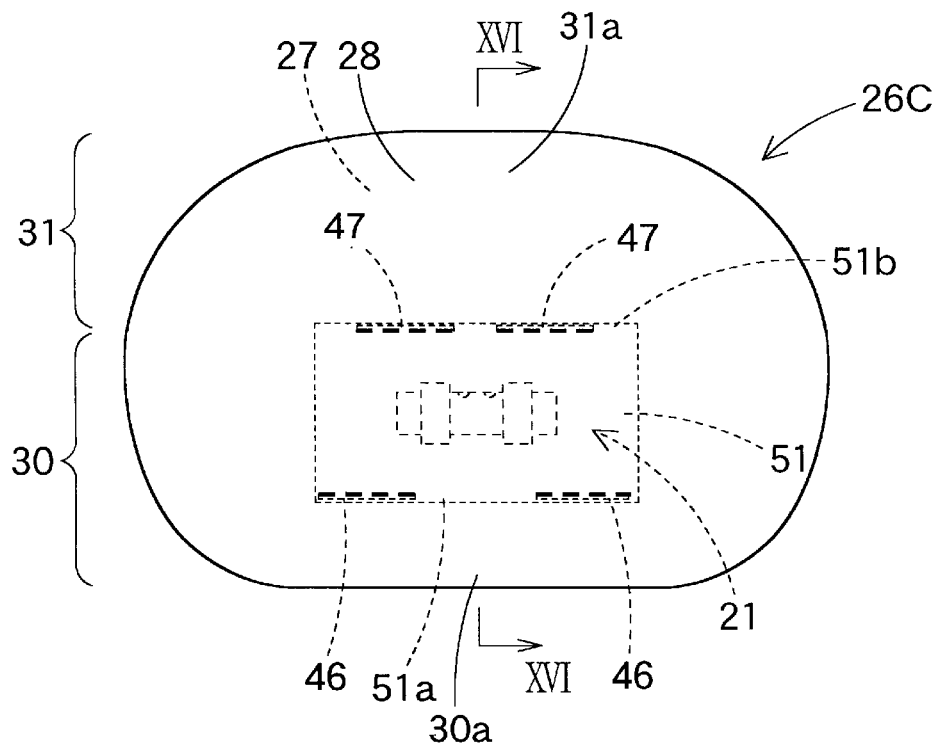
FIG. 15 is a front view of an airbag of a third embodiment when extended and expanded.
Figure 16:
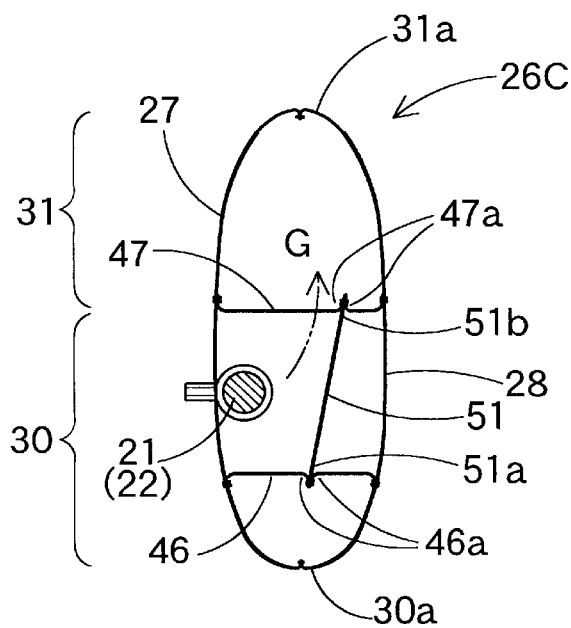
FIG. 16 is a schematic section taken along line XVI—XVI of FIG. 15.

In the knee protecting airbag device M2 of the second embodiment, too, when the airbag 26B is extending and expanding, the lower expansion portion 30 protrudes toward the rear HB of the vehicle from the opening 17 of the case 19, as shown in FIGS. 14A and 14B, to cover the front sides of the knees K of the driver D. The upper expansion portion 31 protrudes in the upward direction VU from the lower expansion portion 30 along the rear face 8a of the column cover 8. The upper expansion portion 31 covers the portion of the airbag cover 13 above the opening 17 and at least the vicinity of the upper end 8b of the column cover rear face 8a. Therefore, the airbag 26B can acquire actions and effects similar to those of the first embodiment. The airbag 26B is provided with the gas communication port 49 for introducing the inflating gas G in a direct line into the upper expansion portion 31. In the airbag 26B, therefore, the expansion completion of the upper expansion portion 31 to protrude along the column cover rear face 8a is promoted.

If hard members 6, such as the parking brake release lever 6d, are not arranged at the portion of the dashboard 10 near the column cover rear face 8a, the upper expansion portion 31 is narrow in its upper end portion 31a in the transverse direction, due to the contour shapes of the airbag 26, 26A or 26B, to eliminate the left and right spaces S of the upper end portion 31a, as shown by double-dotted lines in FIG. 12. Specifically, the airbag may be constructed to substantially cover only the upper end 8b of the column cover rear face 8a. The airbag is reduced in total volume because of the absence of the spaces near the two left and right sides of the upper end portion 31a. In this airbag, therefore, it is possible to shorten the time period from the start to the completion of the expansion.

In connection with the flow of the inflating gas to the upper expansion portion, a knee protecting airbag device M3 of a third embodiment may be constructed, as shown in FIGS. 15 to 17A and 17B. In the airbag device M3, a flow-directing cloth 51 is arranged to deflect the inflating gas G flowing from the lower expansion portion 30 to the upper expansion portion 31 of an airbag 26C, upward along the column cover rear face 8a.

In the third embodiment, the airbag 26C has the flow-directing cloth 51 arranged therein. The airbag 26C is constructed such that the lower end 30a of the lower expansion portion 30 widely covers the rear face 13a of the airbag cover 13 below the opening 17. Members that are the same as those of the first and second embodiments will not be described and will be designated by the same reference numerals as those of the first and second embodiments.

In the airbag 26C, too, the portions below the later-described tethers 47 constitute the lower expansion portion 30, and the portions above the tethers 47 constitute the upper expansion portion 31.

The flow-directing cloth 51 is formed of a material having a flexibility similar to that of the front wall 27 and the rear wall 28 of the airbag 26C. The flow-directing cloth 51 is arranged to guide the inflating gas G filling the inside of the lower expansion portion 30 when the airbag 26C is extending and expanding, upward along the column cover rear face 8a. In the case of the embodiment, the flow-directing cloth 51 is formed into a generally rectangular shape. The flow-directing cloth 51 has a lower end 51a positioned close to the front wall 27 and an upper end 51b positioned close to the rear wall 28. The flow-directing cloth 51 is arranged by connecting and supporting it on the tethers 46 and 47 so that its face, when the airbag 26C is extending and expanding, covers the inflator 21. The flow-directing cloth 51 extends along the column cover rear face 8a during the expansion of the airbag 26C. The tethers 46 and 47 are connected to the front wall 27 and the rear wall 28. The tethers 46 and 47 are divided at their centers, and their inner end portions 46a and 47a are individually sewn to the flow-directing cloth 51.

Figure 17A:
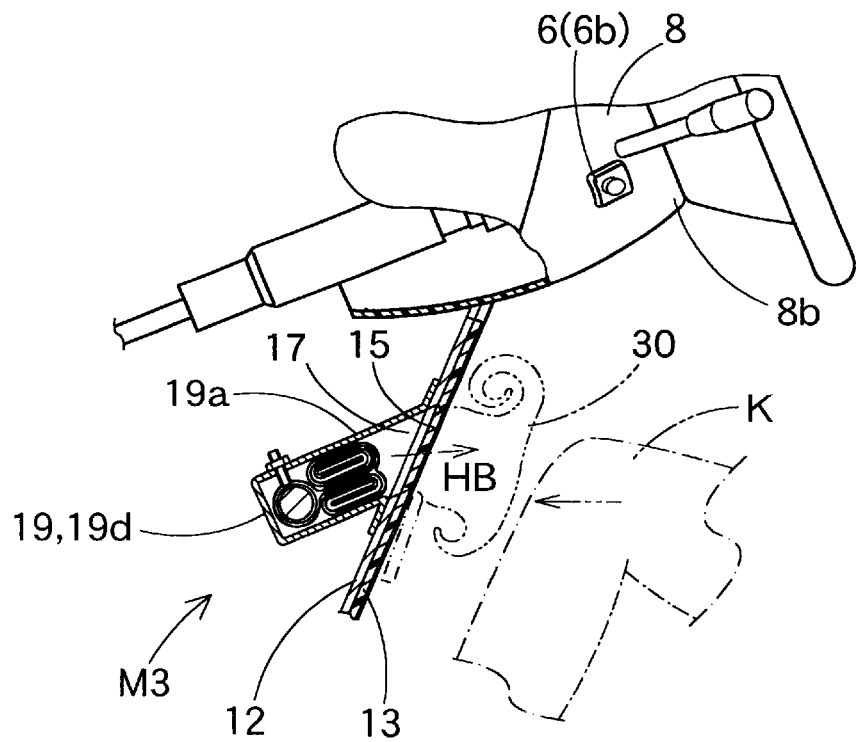
FIGS. 17A and 17B are schematic longitudinal sections illustrating the state of the airbag of the third embodiment when extending and expanding.
Figure 17B:
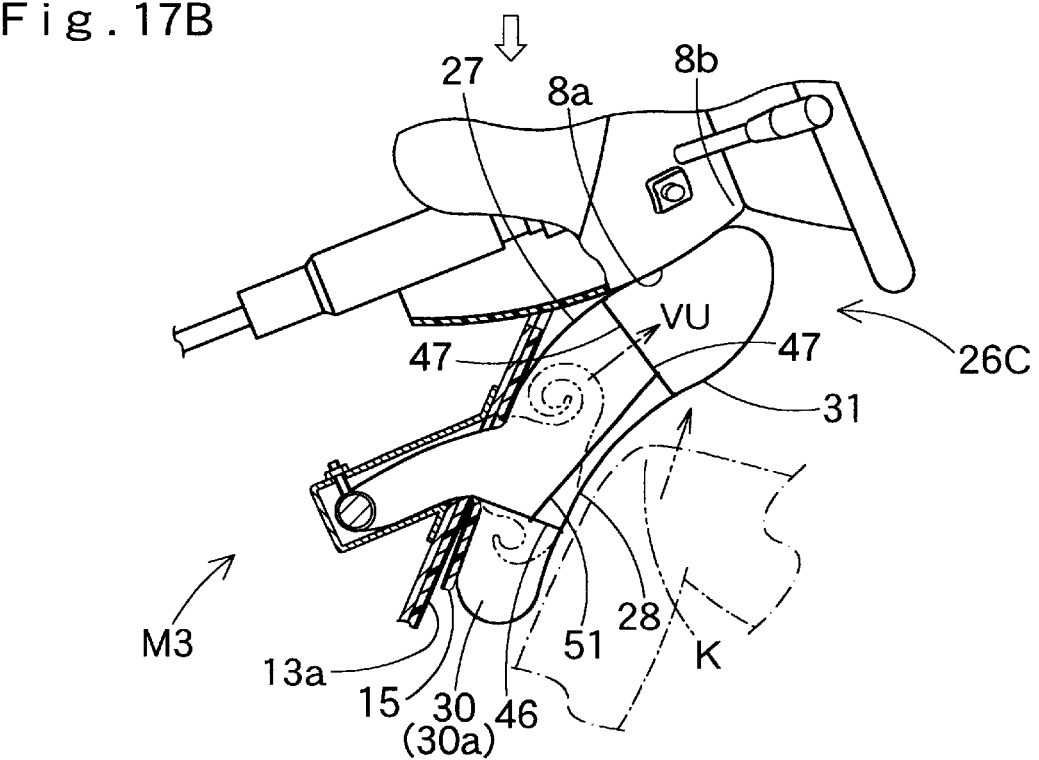

In the knee protecting airbag device M3 of the third embodiment, when the airbag 26C is extending and expanding, the lower expansion portion 30 protrudes toward the rear HB of the vehicle from the opening 17 of the case 19, as shown in FIGS. 17A and 17B, to cover the front sides of the knees K of the driver D. The upper expansion portion 31 protrudes in the upward direction VU from the lower expansion portion 30 along the rear face 8a of the column cover 8 to cover the portion of the airbag cover 13 above the opening 17 and at least the vicinity of the upper end 8b of the side of the column cover rear face 8a. Therefore, the airbag device M3 has actions and effects similar to those of the first and second embodiments.

In the third embodiment, the inflating gas G is deflected by the flow-directing cloth 51 to flow from the lower expansion portion 30 to the upper expansion portion 31. Therefore, the upper expansion portion 31 can easily protrude upward from the lower expansion portion 30 along the column cover rear face 8a while limiting protrusion toward the rear HB of the vehicle. Therefore, the upper expansion portion 31 is smoothly deployed between the knees K of the driver D and the column cover rear face 8a. Especially in the airbag 26C, the flow-directing cloth 51, when the airbag 26C expands, extends along the column cover rear face 8a. Therefore, the gas G is guided along the rear face 8a of the column cover 8 so that protrusion of the upper expansion portion 31 toward the vehicle rear is more suppressed when the airbag 26C is extending and expanding.

The flow-directing cloth may be constructed such that it is connected only to the front wall 27. For example, the flow-directing cloth may be in a semi-circular pipe shape with an inverted-U-shaped section, and the two circumferential edges may be joined by sewing them to the front wall 27 around the inflator 21.

Figure 18:
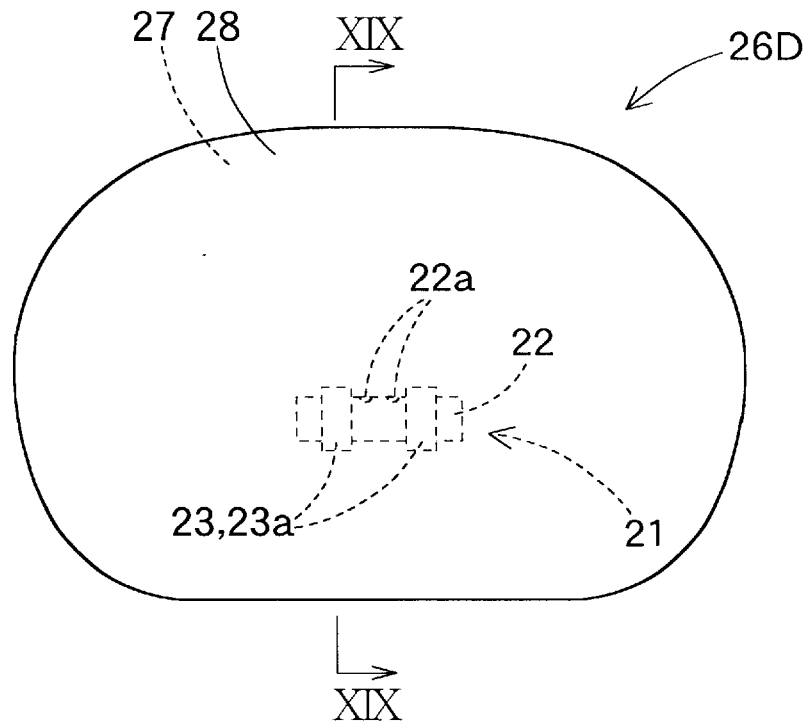
FIG. 18 is a front view of an airbag of another modification when extended and expanded.
Figure 19:
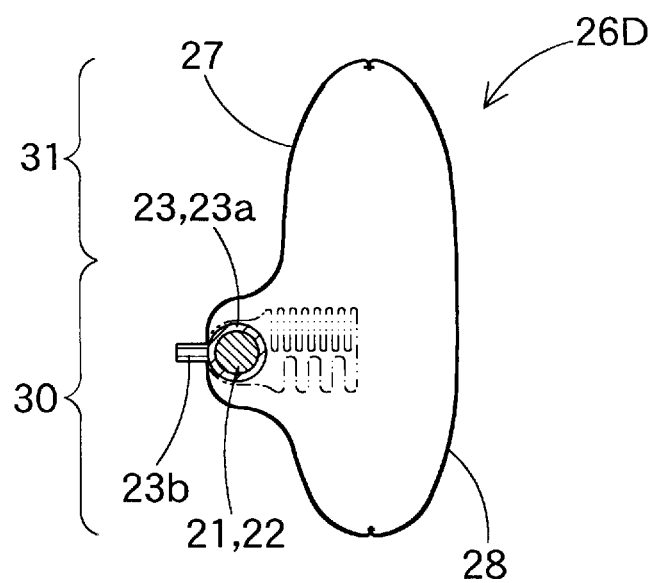
FIG. 19 is a schematic section taken along line XIX—XIX of FIG. 18.

The airbag maybe manufactured like the airbag 26D, as shown in FIGS. 18 and 19, by cutting the bag material into three-dimensional shapes considering the expansion shape. The airbag may be folded in a manner other than the vertical folding step and the transverse folding step of the first to third embodiments. As indicated by double-dotted lines in FIG. 19, for example, the airbag 26D may be folded by the cactus folding method so that it can be housed in the case 19. In the cactus folding method, the outer peripheral edge of the airbag 26D is folded upon itself toward the interior of the airbag 26D. In addition, the airbag can be folded by other methods.

Figure 20:
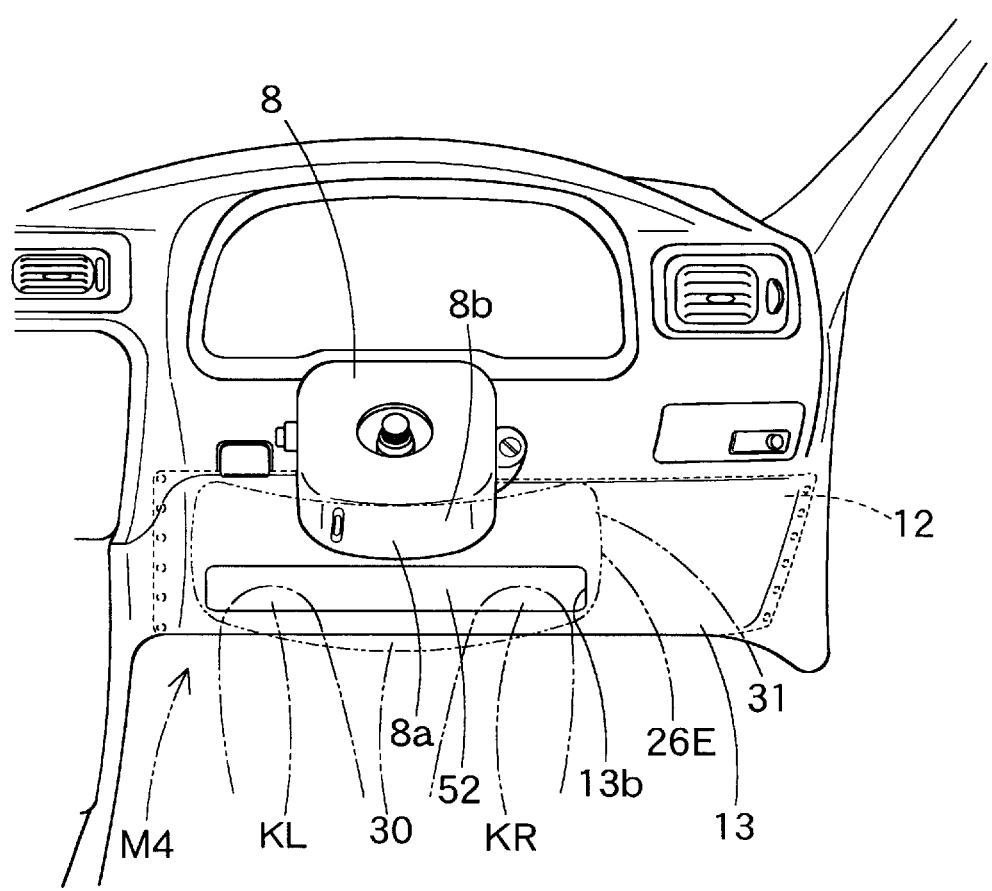
FIG. 20 is a schematic compartment front view taken from the rear side of the vehicle illustrating the extension and expansion of an airbag of a fourth embodiment.
Figure 21:
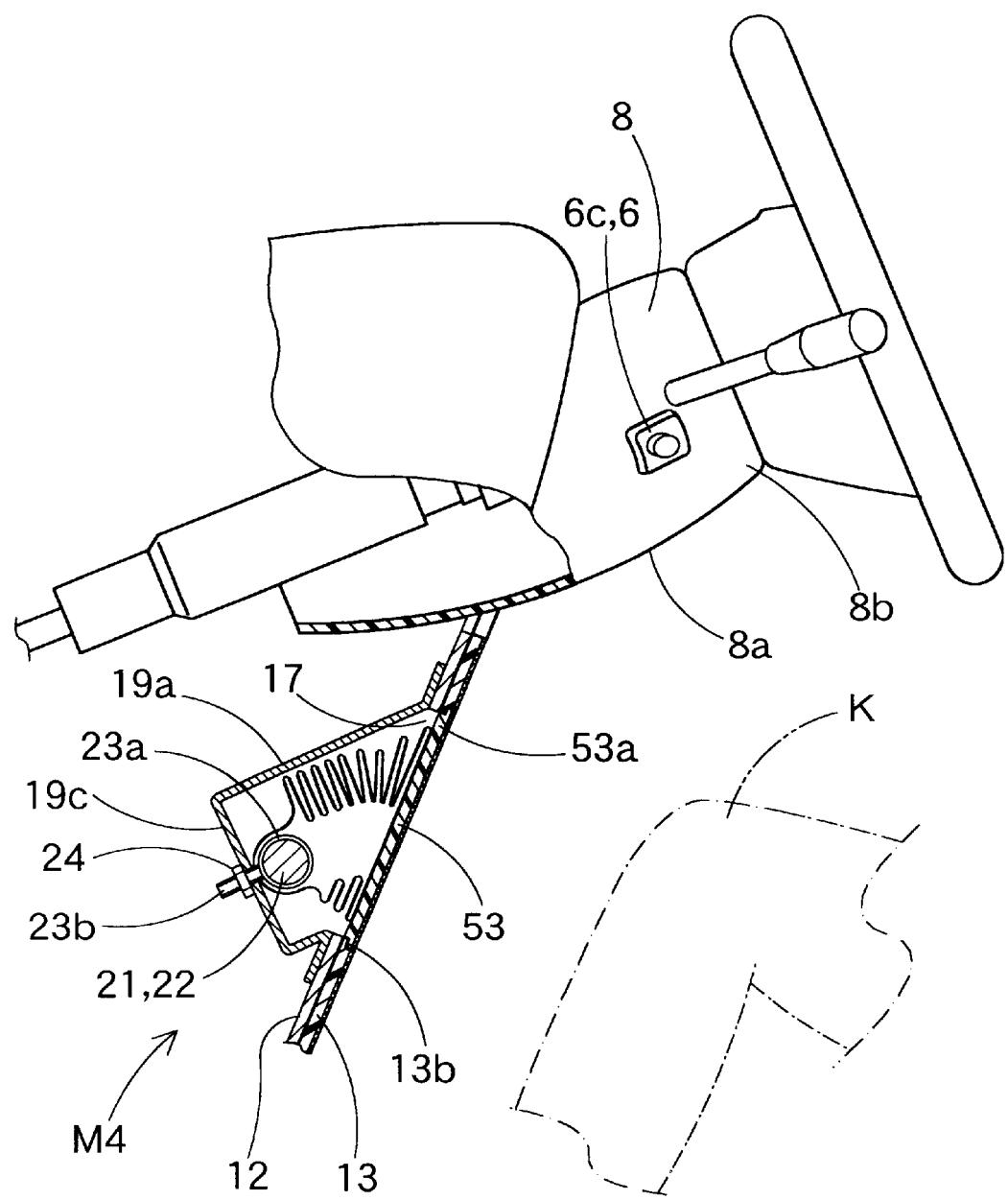
FIG. 21 is a schematic longitudinal section showing the operational state of the fourth embodiment.
Figure 22:
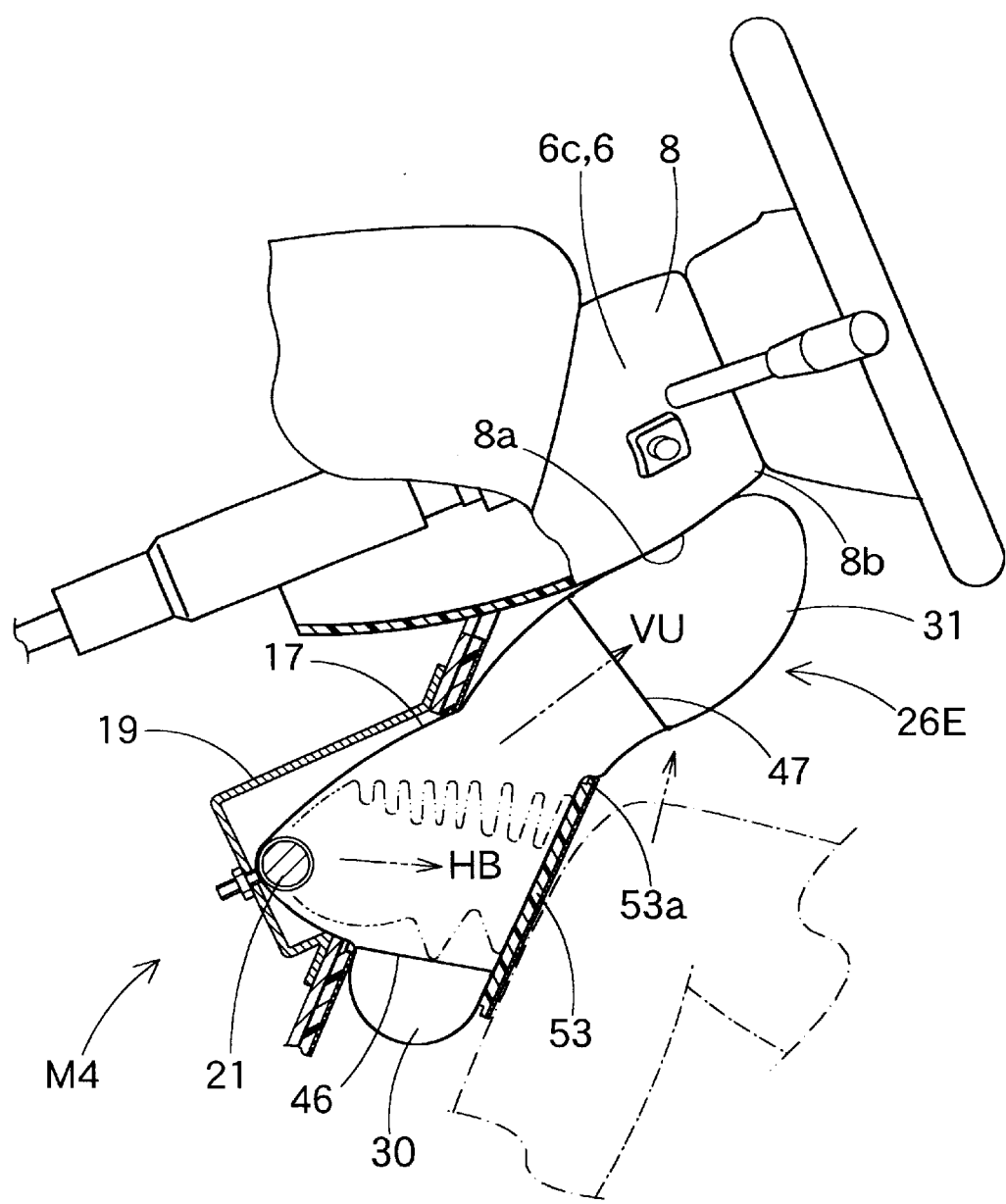
FIG. 22 is a schematic longitudinal section taken upon completion of the extension and expansion of the airbag of the fourth embodiment.

As in a knee protecting airbag device M4 of a fourth embodiment shown in FIGS. 20 to 22, a cushioning pad 53 made of urethane or the like may be used. The pad 53 is jointed to the outer surface side of the rear wall 28 in the lower expansion portion 31 of an airbag 26E by using an adhesive or the like.

The pad 53 is shaped to clog the opening 17 when it is housed in the case 19 for housing the airbag 26E. When housed, the pad 53 is made generally flush with the airbag cover 13 or the peripheral edge of the opening 17. In other words, the pad 53 covers the vehicle side of the airbag 26E, when the airbag 26E is housed, like the door portion 15 of the airbag cover 13 of the first to third embodiments. The airbag cover 13 of the fourth embodiment has only the role of an interior decoration member for covering the vehicle interior side of the holding member 12. On the other hand, the cover 13 is provided with a through hole 13b to be fitted in the opening 17. The pad 53 is arranged by fitting it in the through hole 13b.

The pad 53 has a cushioning property. However, the pad 53 is more rigid than the wall portions 27 and 28 of the airbag 26E. Therefore, the pad 53 is not largely curved upon completion of the expansion of the lower expansion portion 30. As a result, the pad 53 keeps a sheet shape substantially upon completion of the expansion of the lower expansion portion 30 while remaining joined to the rear wall 28.

The case 19 together with the opening 17 of the fourth embodiment is made larger than those of the first to third embodiments. This is because the pad 53 for clogging the opening 17 is enlarged so as to protect the two knees KL and Kr of the driver D sufficiently when the pad 53 is moved toward the rear of the vehicle and arranged on the front side of the knees K of the driver D.

The airbag 26E per se is similar to the airbag 26B of the second embodiment. And, the airbag 26E has the tethers 46 and 47 arranged therein to envelop the inflator 21.

The airbag 26E of the fourth embodiment is folded by using the cactus folding method. For the cactus folding method, the portion of the airbag 26E protruding around the pad 53 when expanded is folded in behind the pad 53 toward the front of the vehicle. The folding method of the airbag 26E need not be the cactus method as long as the bag is folded behind the pad 53 toward the front of the vehicle.

In the knee protecting airbag device M4 of the fourth embodiment, the airbag 26E starts its extension and expansion when the inflator 21 acts to discharge the inflating gas G. Then, the lower expansion portion 30 protrudes toward the rear HB of the vehicle from the opening 17 of the case 19. Therefore, the pad 53 moves toward the rear HB of the vehicle as the lower expansion portion 30 protrudes, so that it is arranged on the front side of the knees K. Thus, the cushioning pad 53 covers the front sides of the knees K of the driver D. Even if the knees K move forward relative to the vehicle, therefore, the pad 53 can protect the knees K properly. As the lower expansion portion 30 extends and expands, the upper expansion portion 31 protrudes in the upward direction VU from the side of the upper edge 53a of the pad 53 along the rear face 8a of the column cover 8. The upper expansion portion 31 covers the portion of the airbag cover 13 above the opening 17 and at least the vicinity of the upper end 8b on the side of the column cover rear face 8a. Even if the knees K move up the rear face 8a of the column cover 8 to where hard members such as the key cylinder 6a are arranged, therefore, the upper expansion portion 31 can protect the knees K against such hard members 6.

Naturally, in the knee protecting airbag device M4 of the fourth embodiment, when the airbag 26E is housed in the case 19, the pad 53 is generally flush with the airbag cover 13 or the peripheral edge of the opening 17, to clog the opening 17. In the airbag device M4, therefore, the design of the peripheral edge of the opening 17 on the vehicle rear side can be improved by the pad 53.

In addition, the pad 53 may be arranged in the airbags 26, 26A, 26C and 26D thus far described.

The upper expansion portion 31 of the airbags 26, 26A, 26B, 26C, 26D and 26E of the individual embodiments may start their expansion either after or before the expansion of the lower expansion portion 30 completes.

The airbags 26, 26A, 26B, 26C, 26D and 26E of the individual embodiments have been described on the case in which the inflator 21 is arranged therein. However, the inflator 21 need not be arranged in the airbags 26, 26A, 26B, 26C, 26D and 26E. For example, the airbag may be constructed such that a gas inlet port for introducing the inflating gas from the inflator is opened in the lower expansion portion 30 and such that the opening is connected with the inflator.

In the individual embodiments, the housing member (or the case) 19 for housing the airbags 26, 26A, 26B, 26C, 26D and 26E is held by the holding member 12, which is separate from the column cover 8 and arranged below the column cover 8. However, the airbag may be housed in the column cover 8. Alternatively, the airbag may be housed in the lower panel of the dashboard 10 when the lower panel is arranged below the column cover 8.

The individual embodiments are constructed to protect the knees K of the driver D. However, the individual airbag devices M1, M2, M3 and M4 may be mounted on the dashboard in front of the passenger seat to protect the knees of the passenger.

Figure 23:
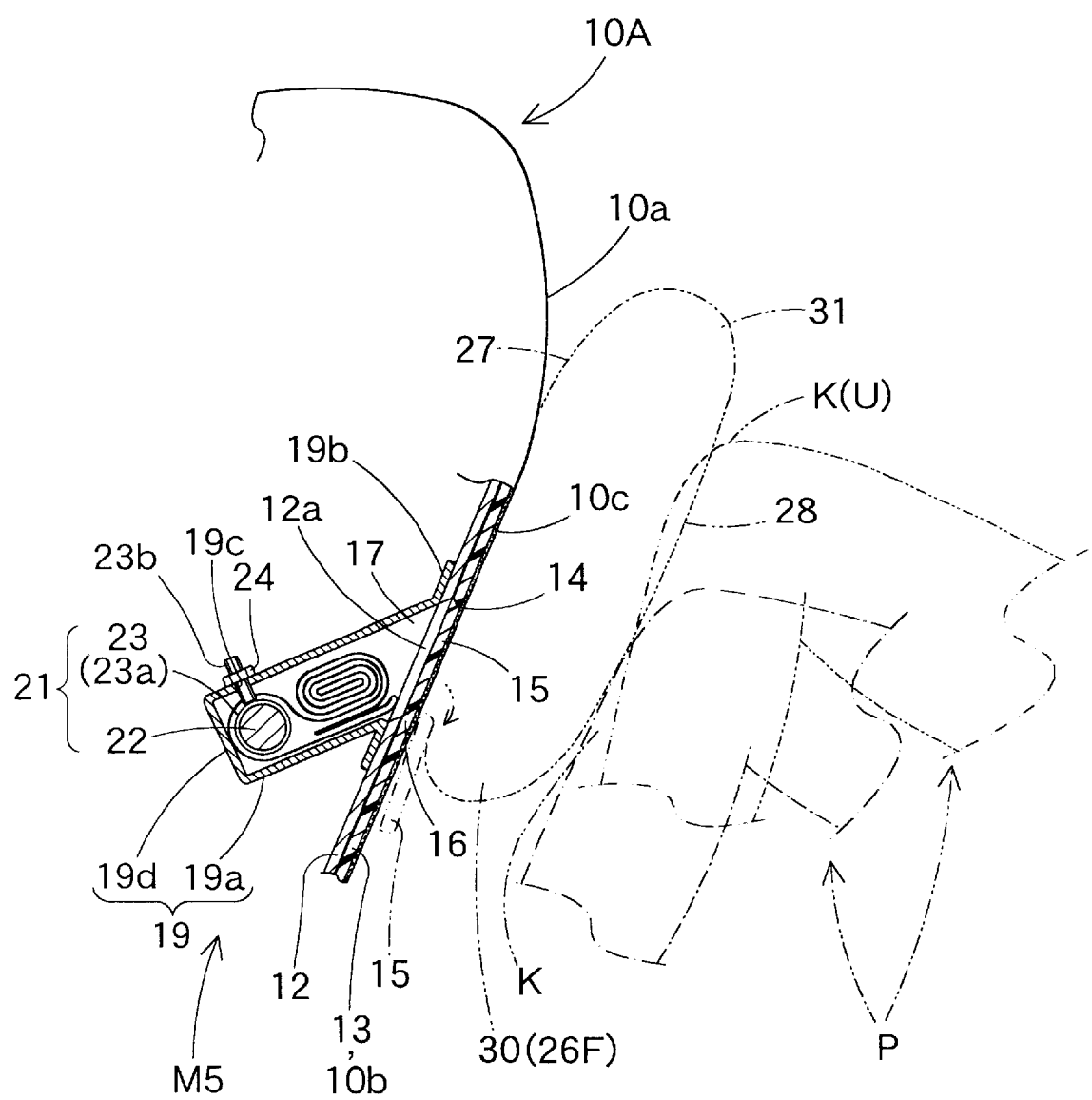
FIG. 23 is a schematic section showing the operating state of a fifth embodiment and taken in the longitudinal directions of the vehicle.
Figure 24:
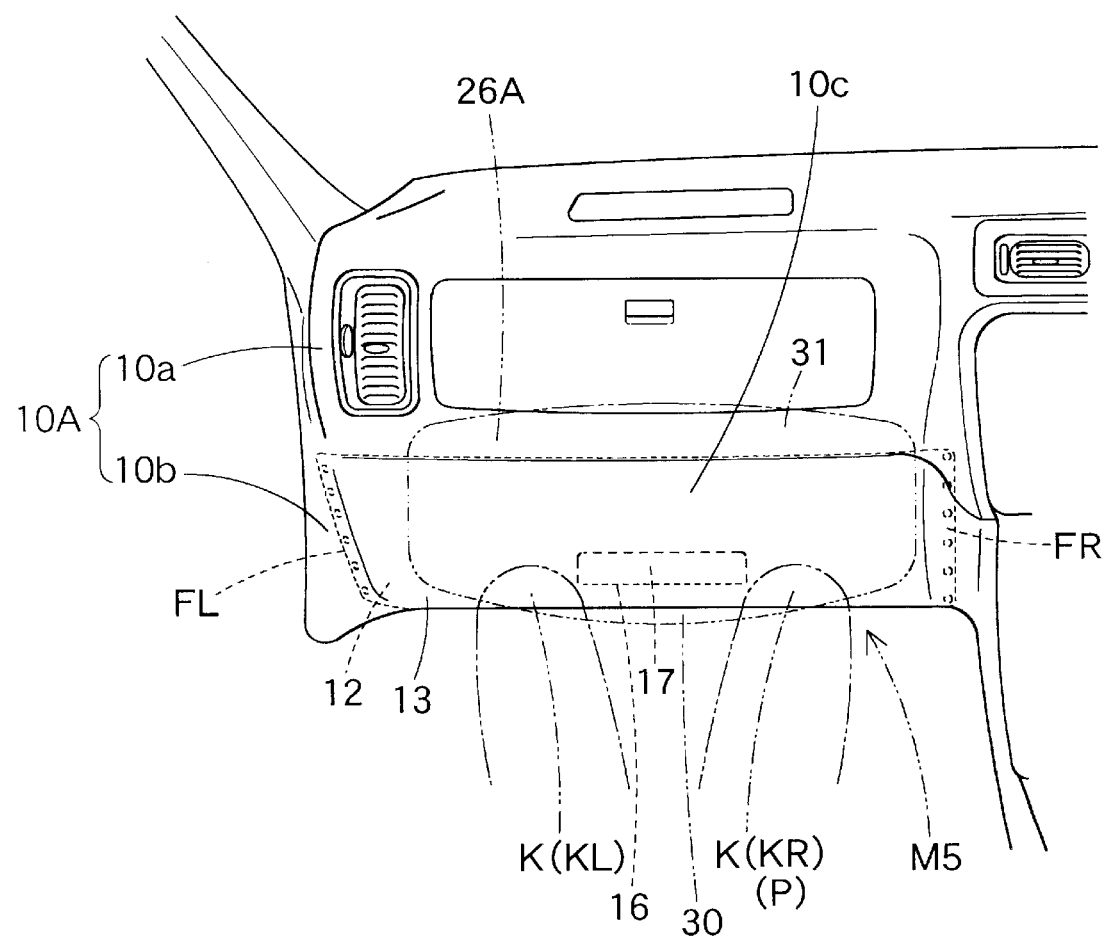
FIG. 24 is a schematic compartment front view taken from the rear side of the vehicle illustrating the extension and expansion of the airbag of the fifth embodiment.
Figure 25:
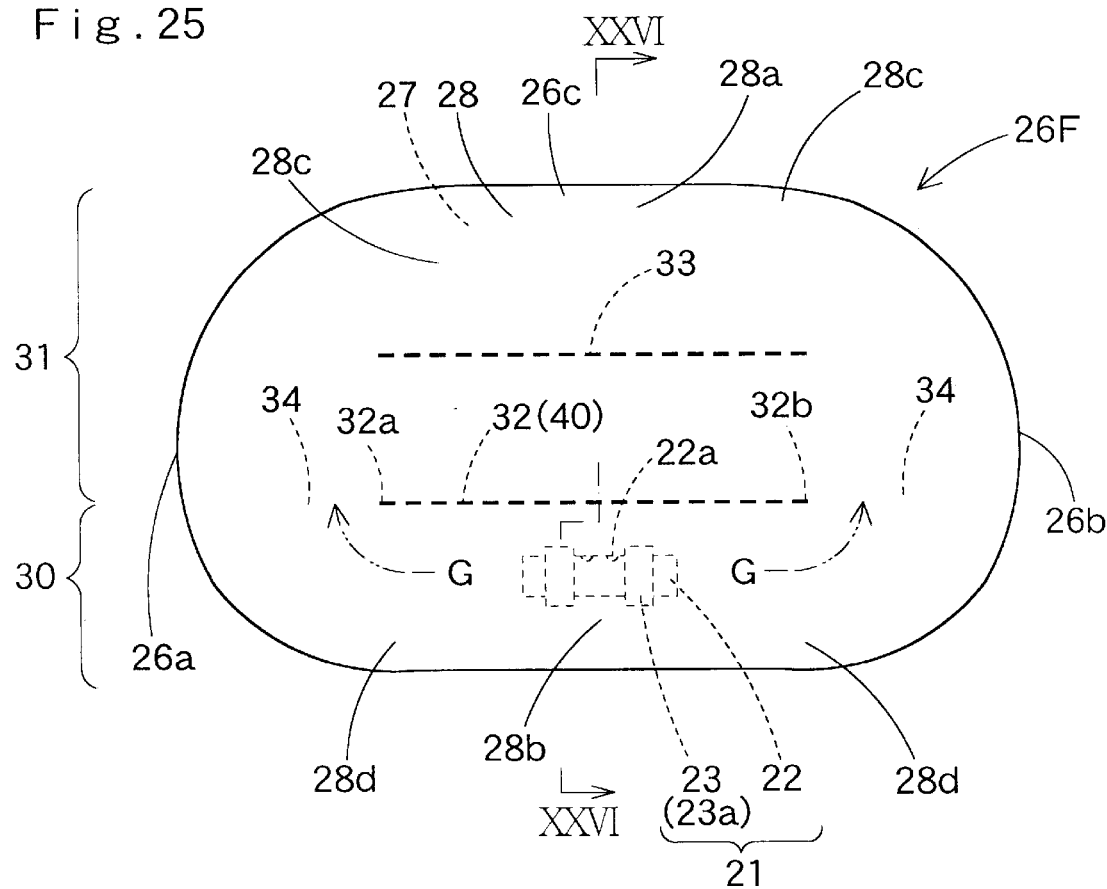
FIG. 25 is a front view of the airbag of the fifth embodiment when extended and expanded.
Figure 26:
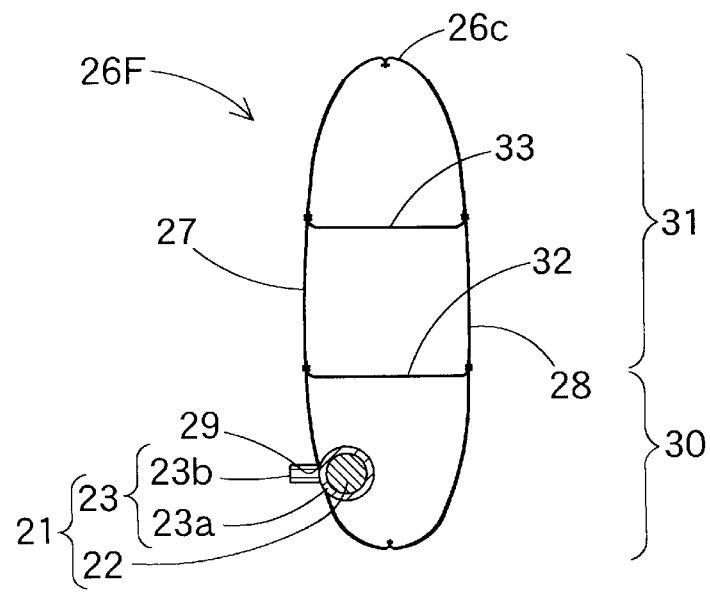
FIG. 26 is a schematic section taken along line XXVI—XXVI of FIG. 25.

A knee protecting airbag device M5 of a fifth embodiment shown in FIGS. 23 and 24 protects the knees K (KL and KR) of a passenger P. The airbag device M5 is arranged on the lower side of a dashboard 10A and in front of the knees K of the passenger P. An airbag 26F is provided like the airbag 26 of the first embodiment with the tethers 32 and 33, as shown in FIGS. 25 and 26. However, the airbag 26F is slightly wider in the transverse directions than the airbag 26 of the first embodiment. The remaining constructions of the airbag 26F are similar to those of the airbag 26.

Like the airbag 26, the airbag 26F houses the inflator 21 and is housed in the case 19 through the vertical folding step and the transverse folding step. The airbag cover 13 is formed integrally with a lowerpanel 10b located below an upper panel 10a of the dashboard 10A. The dashboard 10A is a member attached to the vehicle body together with the airbag cover 13. In FIGS. 23 and 24, parts that are the same as those of the first embodiment are designated by common reference numerals.

In the airbag device M5, when activated, the airbag 26F extends and expands like the airbag 26 of the first embodiment and exhibits actions and effects similar to those of the first embodiment.

In the airbag device M5, more specifically, at the extending and expanding time of the airbag 26F, the lower expansion portion 30 protrudes, as in the first embodiment, from the opening 17 of the case 19 toward the vehicle rear to cover the front sides of the two knees KL and KR of the passenger P. The upper expansion portion 31 protrudes upward from the lower expansion portion 30 along the rear face 10c of the dashboard 10A, and covers the area above the opening 17 in the dashboard 10A and the vicinity of the upper portion of the side of the rear face 10c of the upper panel 10a.

Here in the knee protecting airbag device M5 for the passenger seat side, the airbag 26F may be replaced by the foregoing airbags 26, 26A, 26B, 26C, 26D and 26E.

What is claimed is:

1. A knee protecting airbag device for a vehicle comprising:
   an airbag for inflating, when fed with an inflating gas, to protect the knees of a passenger; and
   a housing portion arranged below a member attached to the vehicle and in front of the knees of the passenger for housing the airbag in a folded state, wherein:
      said housing portion includes an opening for permitting said airbag to protrude toward the rear of the vehicle;
      said airbag is arranged to extend and expand, when fed with said inflating gas, while protruding from said housing portion toward the rear of the vehicle; and
      said airbag includes:
         a lower expansion portion, which is located in an upstream part of a flow of said inflating gas, and the lower expansion portion protrudes from the opening of said housing portion toward the rear of the vehicle when fed with said inflating gas, to protect said knees; and
         an upper expansion portion that communicates with said lower expansion portion and is in a downstream part of the gas flow, and the upper expansion portion protrudes upward from said lower expansion portion along a rear face of said member attached to the vehicle to cover the opening and at least an area above the opening;
      at an initial stage of the extension and expansion of said airbag, said lower expansion portion protrudes toward the rear of the vehicle from the opening and then extends and expands transversely to cover the areas to the left and right of said opening:
      means for transversely extending and expanding said lower expansion portion includes a gas flow guide member arranged in said airbag for guiding said inflating gas in said lower expansion portion toward opposite, transverse sides of the airbag:
      said airbag includes, upon completion of the extension and expansion, a front wall and a rear wall;
      a tether is arranged in said airbag for connecting said front wall and said rear wall to regulate the thickness of said lower expansion portion during the extension and expansion of the airbag;
      left and right ends of the tether are spaced from corresponding left and right edges of said airbag, and the tether is arranged in a transverse direction to form said gas flow guide member; and
      includes a gas communication port near its center for feeding the inflating gas to said upper expansion portion.

2. A knee protecting airbag device according to claim 1, wherein:
   an inflator for discharging said inflating gas is arranged in the lower expansion portion of said airbag, and
   said gas flow guide member covers the inflator and is formed in a tubular shape such that left and right ends of the gas flow guide member are opened.

3. A knee protecting airbag device according to claim 2, wherein said gas flow guide member has an auxiliary opening at a transverse central portion of the gas flow guide member for feeding the inflating gas to said upper expansion portion.

4. A knee protecting airbag device according to claim 3,
   wherein said gas flow guide member has narrow openings at its left and right ends, and
   wherein said auxiliary opening is sewn at its peripheral edge with a sewing thread, for allowing said auxiliary opening to open when the thread is broken.

5. A knee protecting airbag device for a vehicle comprising:
   an airbag for inflating, when filled with an inflating gas, to protect the knees of a passenger; and
   a housing arranged below a fixed member of the passenger compartment and in front of the knees of the passenger for housing the airbag in a folded state, wherein:
      the housing includes an opening for permitting the airbag to protrude toward the rear of the vehicle;
      the airbag is arranged to extend and expand, when fed with the inflating gas, while protruding from the housing portion toward the rear of the vehicle; and
      the airbag includes:
         a lower expansion portion, which is located in an upstream part of a flow of the inflating gas, and the lower expansion portion protrudes from the opening of the housing portion toward the rear of the vehicle when filled with the inflating gas, to protect the knees; and
         an upper expansion portion, which communicates with the lower expansion portion and is in a downstream part of the gas flow, and the upper expansion portion protrudes upward from the lower expansion portion along a rear face of the fixed member to cover the opening and at least an area above the opening;
      at an initial stage of the extension and expansion of the airbag, the lower expansion portion protrudes toward the rear of the vehicle from the opening and then extends and expands transversely to cover areas to the left and right of the opening;
      a gas flow guide member is located in the airbag for guiding the inflating gas in the lower expansion portion toward opposite, transverse sides of the airbag;
      the airbag includes a front wall and a rear wall;
      a tether device is arranged in the airbag for connecting the front wall and the rear wall to regulate the thickness of the lower expansion portion during the extension and expansion of the airbag;
      left and right ends of the tether device are spaced from corresponding left and right edges of the airbag to form gas flow passages between the upper expansion portion and the lower expansion portion, and the tether device forms the gas flow guide member; and
      at approximately the center of the tether device, the tether device defines a gas communication port for permitting the inflating gas to flow from the lower expansion portion to the upper expansion portion.

* * * * *